United States Patent [19]
Nishimura et al.

[11] Patent Number: 5,845,125
[45] Date of Patent: Dec. 1, 1998

[54] DEBUGGER USING CLASS INFORMATION AND DYNAMIC INSTANCE INTER-RELATIONSHIPS

[75] Inventors: Tomoko Nishimura, Yokohama; Masato Igarashi, Yachiyo; Noriaki Koyama, Fuchu; Katsuhiko Ueki, Tokyo, all of Japan

[73] Assignee: Kabushiki Kaisha Toshiba, Kawasaki, Japan

[21] Appl. No.: 797,123

[22] Filed: Feb. 10, 1997

Related U.S. Application Data

[63] Continuation of Ser. No. 263,437, Jun. 21, 1994, abandoned.

[30] Foreign Application Priority Data

Jun. 21, 1993 [JP] Japan .................................. 5-149529

[51] Int. Cl.$^6$ ...................................................... G06F 11/30
[52] U.S. Cl. ............................................................ 395/704
[58] Field of Search ..................................... 395/701, 704

[56] References Cited

U.S. PATENT DOCUMENTS

| 4,827,404 | 5/1989 | Bartstow et al. | 395/500 |
|---|---|---|---|
| 4,885,717 | 12/1989 | Beck et al. | 395/704 |
| 5,093,914 | 3/1992 | Coplien et al. | 395/704 |
| 5,432,903 | 7/1995 | Frid-Nielsen | 395/701 |

OTHER PUBLICATIONS

Charles Petzold, "The Visual Development Environment More Than Just a Pretty Face?", Jun. 16, 1992 PC Magazine.
Moher, T, "Provide: A Process Visualization and Debugging Environment", IEEE Transactions On Software Engineering, vol. 14, No. 6, Jun. 1988.

*Primary Examiner*—James P. Trammell
*Assistant Examiner*—John Q. Chavis
*Attorney, Agent, or Firm*—Oblon, Spivak, McClelland, Maier & Neustadt, P.C.

[57] ABSTRACT

A debugger which helps a user perform object-based debugging. A class information generation section (8) generates class information based on the source code. The execution section (12) executes the program. The object information generation section (13) generates object information based on class information and execution information. The user sets a breakpoint in a desired object via the breakpoint setting section (16). A breakpoint may be set at a desired location in the object. The break processing section (18) detects a breakpoint and breaks the execution of the program. The reservation section (21) reserves a debug operation with the identifier of an object. When there is an object that can be referenced by the reserved identifier, the reservation execution section (22) executes the operation reserved for the object.

11 Claims, 29 Drawing Sheets

FIG. 3

(Class name;

parent class;

public member object;

private member object;

member function;

(name of class and variable or name of global variable that can reference this class))

FIG. 4

(String;

Char *;

None;

None;

print( ),....;

(ClassA, str), ...   )

(ClassA;

None;

String type str;

integer type x;

print( ), ....;

(ClassB, classA), ... )

*FIG. 7* class name:

(object ID, start address, (class name of member data, name, ID), ... ))

FIG. 8

String:

(12, 8000 0800, (Char* name, parent class, 13), ... )

(154, 8000 4800, (Char* name, parent class, 155), ... )

.

.

.

ClassA:

(11, 8000 0000, (String name, str, 12), (integer name, x, 18), ... )

(153, 8000 4000, (String name, str, 154), (integer name, x, 160), ... )

.

.

.

FIG. 11 class name

[object-type breakpoint

[object-specified address-type breakpoint (address, ID1, Id2, ... )]

FIG. 12

String

[12, ... ]

[print( ) : (2000 3300, 12),

[print( ) : (2000 3310, 12),

[print( ) : (2000 3000, 12, 154),

...                        ]

ClassA

[11, ... ]

print( ) : (2000 4000, 11),

...                    ]

FIG. 13 class name

[object type event]

[address type event (address, (ID1, ID2, ... ))]

FIG. 14

String

[12, ... ]

[print( ) : (2000 3000, (154, ... )),

(class name, object name, debug operation contents)

(String, zoo->cat.name, object-type breakpoint)

(String, zoo->dog.name, object-type breakpoint)

DEBUGGER USING CLASS INFORMATION AND DYNAMIC INSTANCE INTER-RELATIONSHIPS

This application is a Continuation of application Ser. No. 08/263,437, filed on Jun. 21, 1994, now abandoned.

BACKGROUND OF THE INVENTION

This invention relates to the improvement in a debugger, which helps the programmer in program debugging (error removal), and more particularly to the improvement in a debugger for object-oriented programs.

It is virtually impossible for a program developer to avoid programming errors when he develops or changes a program, because a computer program is usually composed of complex data processing procedures. Therefore, to increase program reliability, it is necessary to test a developed or changed program to remove (debug) errors (bugs).

A debugger helps the user debug a program. It enables him to debug a program efficiently while allowing him to execute and stop a program to be debugged. To do so, the debugger allows the user to: (1) display a location to which control is currently passed, (2) display data associated with the execution of a program (for example, contents of registers or memory), (3) break (stop) the execution of a program at a user-specified location (breakpoint), and (4) record user instruction or execution information.

Conventionally, a program is built around data processing procedures, and data to be processed is separate from those processing procedures; in addition, data is prepared in such a way that it works with the procedures. This procedure-oriented program is called a procedural program, where source code, usually consisting of a plurality of statements (each representing a description unit such as a declaration or statement), represents data processing procedures that are executed on the computer during execution.

Because of this, when the user uses a conventional debugger, he uses a statement or a line (program coding line) to display the current execution location, to set a breakpoint, or to record debugging history. For example, the user sets a breakpoint on a particular line contained in the source code and, when program control reaches that breakpoint during execution, the debug system stops the program regardless of the order in which lines are executed.

In recent years, object-oriented programming is becoming popular as a new program development means. In object-oriented programming, a real world object to be processed by software is represented as a software "object", and data associated with the real world object and a processing procedure that operates on the data are defined, respectively, as data constituting the object and a processing procedure (for example, "operation function") for the data.

A program which is based on this programming method is called an object-oriented program. An object-oriented program, where a plurality of objects, each corresponding to a real world object, cooperate with each other, makes it possible on the computer to implement data processing similar to that of real world objects. As a result, a real world data structure is well simulated by software and, therefore, a software system that is easy to understand and maintain can be built. In addition, the contents of each module of a program becomes easy to understand, enhancing its modularity and reusability.

Object-oriented programming is done in object-oriented programming languages such as Smalltalk or C++. In this case, the object-oriented design method where a program is developed on a module basis is generally assumed.

In object-oriented programming, a program is conceptually a collection of objects. These objects are loaded into the computer as they are executed, and object data is assigned actual values when allocated in memory areas on the computer.

Thus, a program developed in the object-oriented programming method is in the form of source code. However, source code used in object-oriented programming consists of classes, each of which represents the characteristics of an object. A "class" is a module of a program which represents object data and operation that is to be performed on the object data. In some cases, a plurality of similar objects are generated from the same class, because a "class" functions as a template for generating objects. However, once generated, objects are basically separate entities, with the contents of data varying among objects.

An object-oriented programming language provides the user with a method called "inheritance" to streamline programming. "Inheritance" means that a group of data and the operations on that data are inherited from one class to another. Inheriting a group of data and the operations eliminates the need for the derived class to describe the group of data and the operations again.

This inheritance is implemented by including a specific statement in the source code. Inheritance allows the user to program a new class by simply adding additional data and operations to an existing class, minimizing the amount of coding required.

In general, a derived class is called a child class, and an inherited (original) class is called a base class. Multiple-level inheritance is possible and, in that case, all the derived (higher level) classes, including the base class of a class, the base class of the base class, and so forth, are called indirect base classes, while all the inherited (lower level) classes, including the child class of a class, the child of the child class, and so forth, are called descendant classes.

Conventionally, the debugger described above is also used to debug object-oriented programs.

In an object-oriented program, a class sometimes corresponds to a plurality of objects because a plurality of objects are generated from a class used as a template.

For example, assume that two objects, a1 and a2, which store character strings are generated from the class [character-string] which processes all the character strings. The class [character-string] corresponds to two objects a1 and a2 when the contents of object a1 are "Richard Smith" and the contents of object a2 are the error message "Error1: Disk Full". In this case, if there is a program bug only in the name data processing, it is more efficient to debug only object a1 which contains name data.

However, a conventional debugging system cannot debug an object-oriented program efficiently because it processes the program, not based on objects, but based on the location within the program. That is, a conventional debugging system, which does not process a program on an object basis, has the following problems when used in debugging object-oriented programs:

(1) Display of execution locations

Even if a program execution location is displayed on a class basis, it is difficult to determine which object is executed or operated on (hereafter called a target) when a plurality of objects were generated from the class. For example, even if the class [character-string] is displayed as the execution location in the above example, it is difficult to determine which object, a1 or a2, is the target. Therefore, the contents of program operation cannot be checked even when control is in object a1 which contains name data.

(2) Breakpoint setting

A conventional debugger allows the user to set a breakpoint only on a class in the source code, but not on an object.

For example, even when the user wants to stop the program in a conventional debugging system when control reaches a breakpoint in object a1 which contains name data, he can set a breakpoint only on the class [character-string] which handles all the character strings. In this case, a breakpoint occurs not only on object a1 which contains name data, but also on object a2 which contains error messages. This means that the user must display the contents of the target object when a breakpoint is detected in order to check whether it is object a1 which contains name data and, if it is not, must restart the program.

(3) Log data

In a conventional debugger, log data (also called event history data or execution history data), especially the location of a target within a program, is recorded only as the location within the source code. No information is provided for the object that was executed. In the above example, although history data telling that an operation of the class [character-string] was executed is recorded, no information is provided about the object that was executed (object a1 which contains name data or object a2 which contains error messages).

(4) Inheritance

In particular, when a class from which an object to be debugged is generated inherits the characteristics of base class, the correspondence between an execution location within the source code and an object that is executed becomes complex, making debugging more difficult.

That is, when a conventional debugger is used to debug an object-oriented program which has inheritance, the base class name is included in the execution location display during execution of the object of a child class and, therefore, it becomes more difficult to determine the target object. For example, assume that the class [character-string] inherits the characteristics of the class [array], that object "a" is generated from the class [character-string], and that object "b" is generated from the class [array]. The user now wants to do debugging by examining the behavior of object "a" which is associated with the class [character-string].

In this case, when object "a" is executed, the execution location display indicates that the class [character-string] is executed when operation unique to the class [character-string] is executed and that the class [array] is executed when the inherited part is executed, for example, when the class [array] function operation is executed for a character string. When the execution location display indicates that the class [array] is executed, it is impossible for the user to determine whether the class [array] object itself is executed or the inherited part is executed. In particular, when the execution location display changes from the class [character-string] to the class [array], the user cannot determine whether the target object is changed or the inherited part is executed.

In addition, when child class data contains both data generated from the description part unique to the child class and data generated from the inherited part, data is displayed, not on an object basis, but on a class basis even if both data is from the same object.

For example, assume that the class [character-string] inherits the characteristics of the class [array] and that object "a" of the class [character-string] consists of data generated from the description unique to the class [character-string] (that is, not including data generated from the inherited part) and data generated from the part inherited from the class [array]. In this case, a conventional debug system displays data inherited from the class [array] as class [array] data, and data unique to the class [character-string] as class [character-string] data. This prevents the user from debugging "object "a" as a debugging unit, decreasing debugging efficiency.

In addition, to stop an object of a desired class, the user must set a breakpoint even in the inherited part of the base class. However, because this breakpoint also stops the execution of the object of the base class itself, it is difficult to determine the target object.

For example, object a of the class [character-string] which inherits the characteristics of the class [array] executes both the class [character-string] operation and the class [array] operation. Because of this, the user must set a breakpoint not only in the class [character-string] operation but also in the operation inherited from the class [array], in order to break the execution of object "a".

In addition, a breakpoint is usually set only on one line in the source code. For this reason, if a class on which the user wants to break during execution has a plurality of functions that are called by other classes, and if the user wants to break the execution of the object of the class whenever the object is referenced, it is necessary to set a breakpoint in all the functions of the class that are referenced.

When the user sets a breakpoint in all the public functions in the class of the object, he must set a breakpoint in all the public functions that exist in the class of the object and, at the same time, in all the public functions that exist in indirect base classes if the class the user wants to break has inherited some functions from other classes.

In addition, when execution of an object stops upon detecting a breakpoint, that object is not necessarily the one the user intended. That is, that object may be an object generated from one of the indirect base classes, or an object of another class that inherits the characteristics of the indirect base class, or an object of a descendant class of one of those classes.

As a result of the problems described above, the child class execution data in the program execution history contains both child and base class names. This makes it more difficult for the user to determine the target object.

SUMMARY OF THE INVENTION

An object of the present invention to provide solutions to the problems of the prior art described above. It is an object of the present invention to provide a debugger which is based on objects. It is another object of the present invention to provide a debugger that increases debugging efficiency.

To attain the above object, the debugger according to the present invention has the following structure and operation:

The debugger comprises a class information generation means 8 for generating class information representing the structure of the classes of a program based on the source code of a program to be debugged.

The invention, which generates class information representing the structure of classes of a program, makes the class structure easier to understand.

A debugger according to an initial embodiment of the present invention comprises: a class information generation means 8 for generating class information representing the structure of the classes of a program based on the source code of a program to be debugged; an execution means 12 for executing said program and generating execution information; an object information generation means 13 for generating object information about the generation and destruction of each object in said program based on said class information and said execution information during the execution of said program; and an object information output means (6, 4) for outputting said object information.

The invention, which generates and outputs object information about the generation and destruction of program objects, makes the status of objects easier to understand and increases the efficiency of debugging in object-oriented programming.

In an alternate embodiment, the debugger of the initial embodiment further comprises a reference relation information generation means 15 for generating reference relation information representing the reference relation among said objects based on said object information; and a reference relation information output means (6, 4) for outputting said reference relation information.

This embodiment of the invention, which outputs reference relation information representing the reference relation among objects, allows the user to debug a program by referring not only to the object to be debugged but also to one or more objects which have reference relation with the object to be debugged.

Another embodiment of the present invention is a debugger as described in the initial embodiment and further comprising: a breakpoint setting means 16 for setting a breakpoint in said desired object of said program; an execution means 12 for executing said program; and a break means 18 for breaking the execution of said program upon detecting said breakpoint.

This embodiment of the invention, which allows the user to stop a program at a breakpoint that is set in a desired object, enables him to debug a particular object.

In the previous embodiment of the present invention, the breakpoint setting means 16 of the debugger, as described in the previous embodiment, sets said breakpoint in a desired location in said desired object.

Another embodiment of the present invention, which allows the user to set a breakpoint only in a function of an object to be checked or at an address, does not break the execution of a program unless control is passed to that address. This enhances debugging efficiency.

Another embodiment of the present invention is a debugger as described in the previous embodiment, wherein said breakpoint setting means 16 sets said breakpoint in a member which is said object contained in a setting object where a breakpoint is to be set and in a member which is said object contained in a class inherited by said setting object class, and wherein said break means 18 breaks the execution of a program when said object where said breakpoint is set is referenced and when the target of the reference is said setting object.

This embodiment enables the user to set a breakpoint even in a member of the base class of a setting object and, when the member is referenced, to determine whether the target is the object to be debugged. Because of this, the user can break the execution of a program on an object basis even if he uses an inheritance in object-oriented programming.

Another embodiment of the present invention is a debugger as described in the initial embodiment including an event point setting means 16 for setting an event point in said desired object of said program; an execution means 12 for executing said program; an event point detection means 18 for detecting said event point during the execution of said program; an event information generation means 19 for generating event information about the contents of execution at said event point; and an event information output means (6, 4) for outputting said event information.

This embodiment, which is used to record the history of execution in a desired object where an event point is set, enables the user to trace the program behavior of a particular object.

Another embodiment of the present invention is a debugger as described in the previous embodiment, wherein said event point setting means 16 sets said event point in a member which is said object contained in a setting object where a event point is to be set and in a member which is said object contained in a class inherited by said setting object class, and wherein said event point detection means detects said event point when said object where said event point is set is referenced and when the target of the reference is said setting object.

This embodiment allows the user to set an event point in a member of the base class of the setting object and, when the member is referenced, to determine whether the object is the one to be debugged. Because of this, the user can record event data on an object basis even if he uses an inheritance in object-oriented programming.

Another embodiment of the present invention is a debugger as described in the initial embodiment comprising a user interface 26 for performing input/output for each object based on an identifier corresponding to the object in source code.

This embodiment enables the user to perform the input of debugging data and the output of various types of data not only by an object ID within the system but also by an identifier corresponding to the object. This makes data easier to understand, debugging data easier to enter, and therefore, debugging more efficient.

Another embodiment of the present invention is a debugger as described in the previous embodiment including comprising: a reservation means 21 for reserving a desired debug operation using said identifier of an object; and a reservation execution means 22 for executing reserved operation for the object when there is an object that can be referenced with a reserved identifier.

This embodiment enables the user to reserve desired debugging operations, such as breakpoint setting, for a desired identifier. When there is an object which can be referenced by a reserved identifier, the desired operation is performed for the object. This means that, with an identifier specified in the source code, the user can reserve debug operations beforehand or at any time during debugging. This automates the debug operation and, therefore, increases debugging efficiency.

Another embodiment of the present invention is a debugger comprising a multi-window display system for displaying information in one or a plurality of windows, and wherein said display system sequentially calls other information, associated with information displayed in a window, into new windows.

This embodiment enables the user to sequentially call into new windows the various types of information needed for debugging. Thus, the user can use various types of information according to the cause of the bug.

BRIEF DESCRIPTION OF THE DRAWINGS

FIG. 3 shows the general format of class information in the debugger in embodiment 1 of the present invention, FIG. 4 shows an example of class information in the debugger in embodiment 1 of the present invention, FIG. 7 shows the general format of object information in the debugger in embodiment 1 of the present invention, FIG. 8 shows an example of object information in the debugger in embodiment 1 of the present invention, FIG. 11 shows the general format of breakpoint information in the debugger in embodiment 1 of the present invention, FIG. 12 shows an example of breakpoint information in the debugger in embodiment 1 of the present invention, FIG. 13 shows the general format of event point information in the debugger in embodiment 1 of the present invention, FIG. 14 shows an example of event point information in the debugger in embodiment 1 of the present invention, FIG. 20 shows the contents of reservation in the debugger in embodiment 2 of the present invention.

Figure 1:
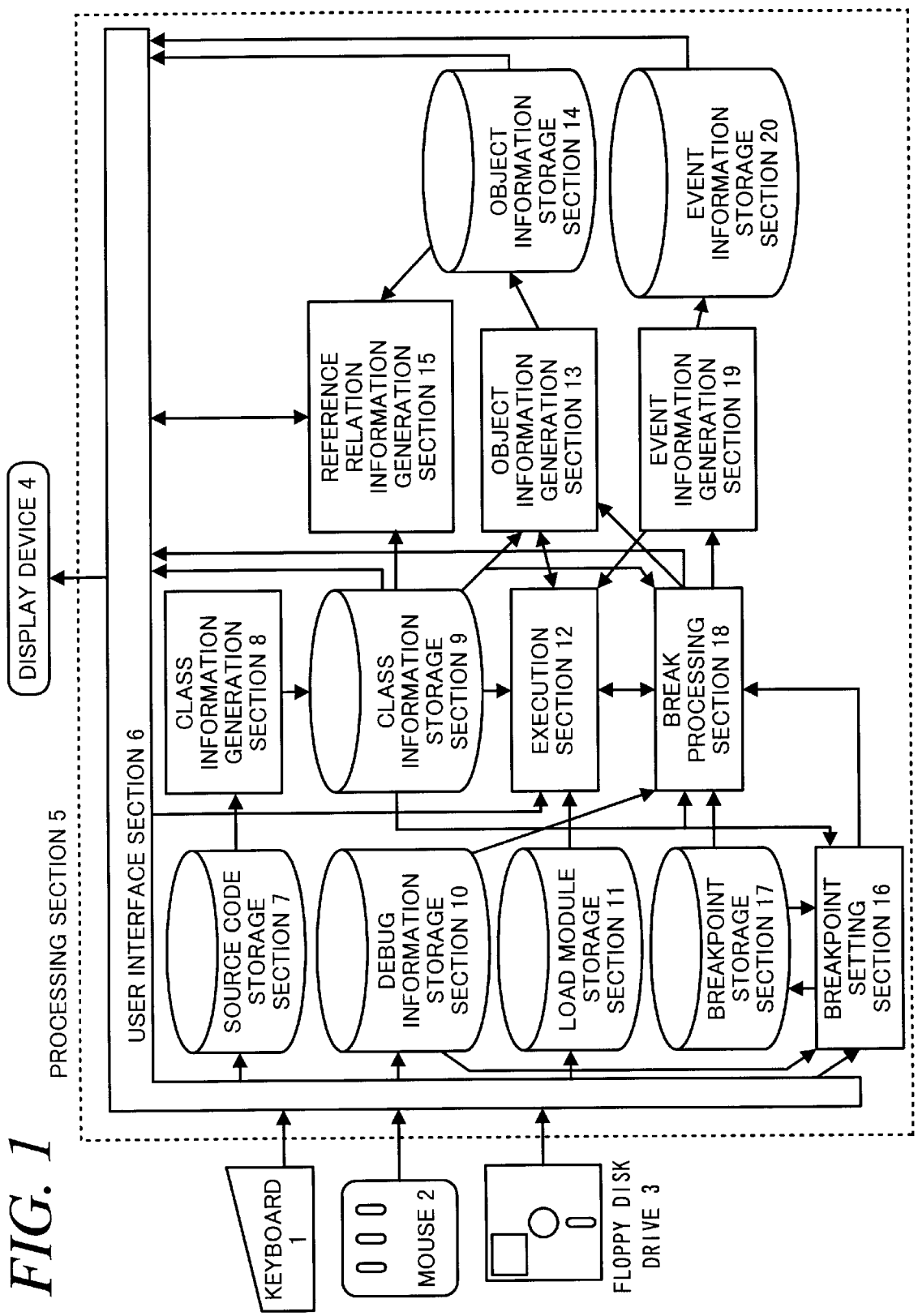
FIG. 1 is the functional block diagram showing the structure of the debugger used in embodiment 1 of the present invention.

In the Figures, 1 indicates a keyboard, 2 indicates a mouse, 3 indicates a floppy disk drive, 4 indicates a display device, 5 indicates the processing section, 6 and 26 indicate the user interface section, 7 indicates the source code storage section, 8 indicates the class information generation section, 9 indicates the class information storage section, 10 indicates the debug information storage section, 11 indicates the load module storage section, 12 indicates the execution section, 13 indicates the object information generation section, 14 indicates the object information storage section, 15 indicates the reference relation information generation section, 16 indicates the breakpoint setting section, 17 indicates the breakpoint storage section, 18 indicates the break processing section, 19 indicates the event information generation section, 20 indicates the event information storage section, 21 indicates the reservation section, and 22 indicates the reservation execution section.

DETAILED DESCRIPTION

Referring to the drawings, there is shown the preferred embodiments of the present invention. The embodiments shown below are implemented on a computer, and each function of the embodiments is implemented by executing a specified procedure (program) on the computer.

Each "means" described in this specification is a conceptual means corresponding to each function of an embodiment; there is not always one to one correspondence between means and hardware units or software routines. For example, a hardware unit, which act as a means when a statement is executed, may also act as another means when another statement is executed. Similarly, a means, which is implemented by a single statement in some cases, may be implemented by a plurality of statements in some other cases.

Therefore, each embodiment in this specification will be described by way of a virtual circuit block (means) having each function of the embodiment. However, the implementation of the present invention on a computer is an example. All or part of the functions of the present invention may be implemented on an electronic circuit such as a custom chip (custom integrated circuit).

The computer used in each embodiment is composed of the CPU and main memory (main storage) consisting of RAM (Random Access Memory). The computer may be a computer of any size: microcomputer, personal computer, small computer, workstation, or mainframe.

The hardware of the computer typically includes input devices such as a keyboard and a mouse, external storage such as a hard disk, output devices such as a CRT display device and a printer, as well as necessary input/output control circuits.

The hardware configuration of the computer may be changed as long as the present invention is implemented; that is, some components may be added, replaced, or removed. For example, the embodiment may be implemented on a computer network with a plurality of computers. Any type of computer may be used concurrently, or one CPU may be time-shared for executing a plurality of processes concurrently. Other input devices (for example, pointing devices such as a touch panel, light pen, and track ball, image input devices such as a digitizer or image reader, voice recognition devices, and various types of sensors) may be used. Other external storage devices (for example, a floppy disk drive, RAM card device, magnetic tape device, optical disk device, optical magnetic disk device, bubble memory device, or flash memory) may be used. Other output devices (for example, liquid crystal device, plasma display device, video projector, LED display device, voice generation circuit, or voice synthesizer) may be used.

In order to implement the embodiment on the computer described above, an application program which implements each function of the embodiment is normally executed under the operating system (OS). In addition, a program which implements the embodiment is in the form of machine language produced typically by compiling (translating) the program with the use of a high-level language or an assembler. However, the software configuration of the above described computer may also be changed as long as the present invention may be implemented; for example, an OS is not necessarily used, any form of program may be used, and an interpreter (serial interpretation-execution) such as BASIC may be used.

The program may be stored in any form; that is, it may be stored in ROM (read only memory), or it may be stored in an external storage device such as a hard disk for later loading (reading) into memory when the computer is started or processing is started. In addition, the program may be divided into a plurality of modules, each of which is loaded into main memory as necessary. In this case, all the modules of the program need not be in the same form or on the same device.

The execution sequence of the procedure steps of the embodiment may be changed, or the steps may be executed in parallel, as long as the object of the present invention is attained. Each step may be executed in any sequence each time it is executed. The user may change the sequence, for example, by using the menu-driven interface through which he can select one of executable processing options.

The term "input" used in this specification refers not only to the input of data but also to other processing closely associated with data input. This type of processing includes such processing as input data echo-back or data modification and editing. The term "output" used in this specification refers not only to the output of data but also to other processing closely associated with data output. This type of processing includes such processing as the input of output ranges or the instruction of scrolling. In addition, input and output may be integrated through the interactive input/output operation, and selection, specification, and identification may be done thorough this integrated input/output operation.

All the events outside the computer are processed within the computer as data, for example, as event parameters. Data (information) described in this specification may be in any form or on any type of storage device. For example, data may be stored on any hardware component (for example, main storage, external storage, CPU registers, or cache memory). In addition, data may be stored in any form. For example, data may be stored in a file, or it may be accessed directly using a physical memory or storage address. Data may be represented in any form; for example, a character string may be represented in characters or words. Data may be stored for the period of time the user wants, and may be erased after the period of time has elapsed. Data that should be stored unaltered for a long time, such as dictionary data, may be stored in ROM.

Any reference to a particular item in this specification assumes that any associated information is also implied. For example, when a disk file is mentioned, it should be understood that the File Allocation Table (FAT) or directories are also mentioned and that their descriptions are omitted. In this specification, general information necessary for the operation of the present invention, such as pointers, counters, flags, parameters, and buffers, is also used as necessary.

Unless otherwise specified, information necessary for the processing of a component in the embodiment is obtained from other components containing the information. This information is obtained, for example, by accessing a variable or memory location containing that information. Note that the erasure or cancellation of information does not necessarily require the deletion of data itself from the storage area; instead, it may be done, for example, by setting the erase flag.

1. Embodiment 1

1-1. Structure of Embodiment 1

It is the object of embodiment 1 to provide a debugger which helps the user perform debugging based on objects. FIG. 1 is the block diagram showing the structure of embodiment 1. As shown in this figure, the debugger in embodiment 1 has the keyboard 1, mouse 2, floppy disk drive 3, display device 4, and processing section 5 which processes information. The processing section 5 has the user interface section 6. This user interface section 6 is constructed by combining the I/O control circuit with the input/output procedure which uses a menu-driven or interactive interface, although they are not shown in the figure. Through this user interface section 6, the user can receive information that is output from each block and can input information or instructions into a desired block. This user interface section 6 corresponds to the object information output means, reference relation information output means, and event information output means.

The debugger in embodiment 1 has the source code storage section 7 where the source code of a program to be debugged is stored, the class information generation section 8 (corresponding to the class information generation means) which generates the class information representing the structure of classes in the program, and the class information storage section 9 where the class information is stored.

The debugger in embodiment 1 has the debug information storage section 10 where the debug information of a program to be debugged is stored, the load module storage section 11 where the load module of the program is stored, the execution section 12 (corresponding to the execution means) which executes the load module and generates execution information about execution contents, the object information generation section 13 (corresponding to the object information generation means) which generates object information about object generation and destruction based on the class information and the execution information during the execution of the program, and the object information storage section 14 where the object information is stored.

The debugger in embodiment 1 has the reference relation information generation section 15 (corresponding to the reference relation information generation means) which generates reference relation information representing the reference relation among the objects based on the object information, the breakpoint setting section 16 (corresponding to the event point setting means and the breakpoint setting means) which sets a breakpoint and an event point in a desired object associated the program or in a desired location in the object, the breakpoint storage section 17 where information representing the breakpoint and event point is stored, and the break processing section 18 (corresponding to the break means and the event point detection means) which breaks the execution of the program at the breakpoint and the event point.

The debugger in embodiment 1 has the event information generation section 19 (corresponding to the event information generation means) which generates event information about execution contents at an event point when the program stops upon detecting the event point and the event information storage section 20 (corresponding to event information storage section) where the event information is stored.

1-2. Operation of Embodiment 1

Debugging is performed as follows in the debugger in embodiment 1 which has the above structure:

1-2-1. Outline of Operation

Figure 2:
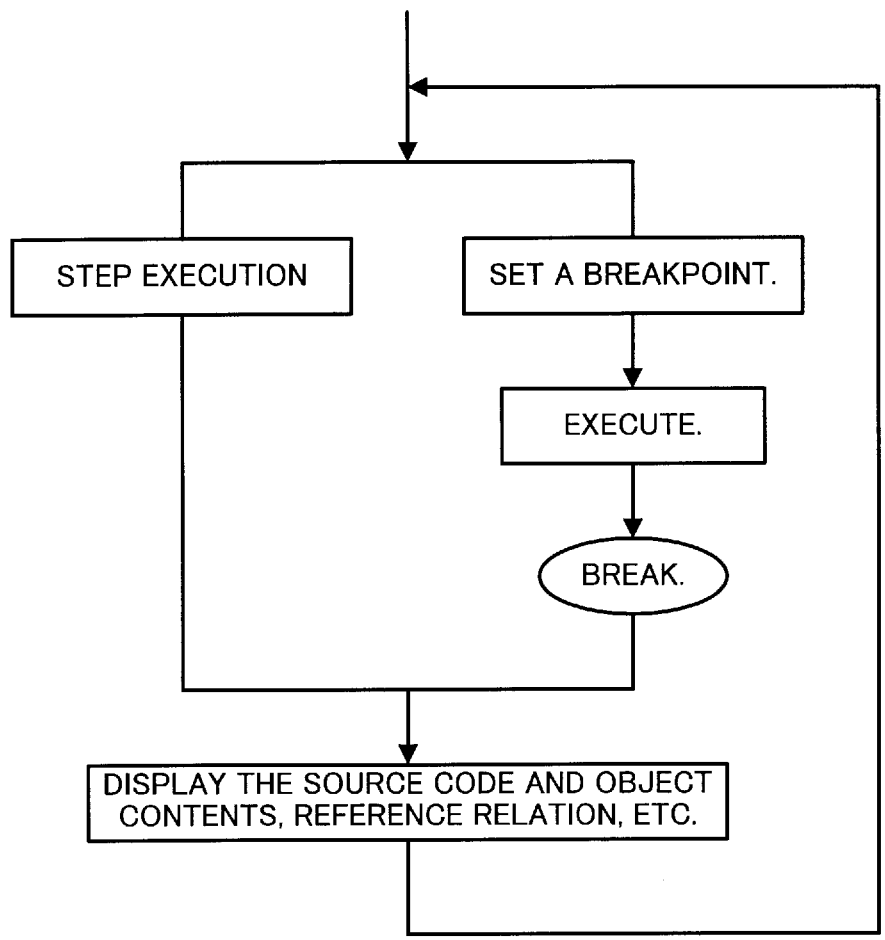
FIG. 2 is the flowchart showing conceptually how debugging is performed in the debugger in embodiment 1 of the present invention.

FIG. 2 is the conceptual diagram showing how debugging is performed by the debugger in embodiment 1. That is, in embodiment 1 of the debugger, a breakpoint is set in a program to be debugged and then the program is executed. When a break (program stop) occurs during the execution of the program, the debugger displays information such as source code to allow the user to debug the program. In embodiment of the debugger, the program may be executed one step at a time to display the source code of each step. The following describes the operation of the debugger in embodiment 1 more in detail.

1-2-2. Data Input

Before debugging, the user uses a compiler to compile the source code of a program to be debugged, and generates a load module (normally, an executable program in machine language) and debug information. The debug information includes the statements (description units) and symbol names (data names, function names, label names, etc.) contained in the source code and the address (memory location) correspondence table. This debug information is generated by the debug information generation function of a standard compiler. The debug information includes identifiers specifying object generation in the source code.

Then, the user enters the source code, debug information, and load module via the disk device 3 and the user interface section 6. They are stored in the source code storage section 7, debug information storage section 10, and load module storage section 11, respectively.

1-2-3. Extraction of Class Information

Then, the class information generation section 8 generates class information representing the class structure in the source code based on the source code, and the generated class information is stored in the class information storage section 9. In the source code of a program coded in an object-oriented programming language, class structure information is defined in a specified format. Thus, information about class inclusion relation among classes, inheritance relation among classes, and class internal structure (data and operation, etc.,) can be extracted from the source code easily.

FIG. 3 shows the general format of class information in the debugger in embodiment 1. For each class, a class name and a base class name are followed by the member names of the objects of the class. A "member" refers to data (member data) constituting the object, and to the operation to be performed on the data. In this specification, member data is mentioned as a "member object", because member data is thought of as a separate member owned by the object no matter how simple it is. Also, in this specification, an operation to be performed on an object member is mentioned as a "member function". This type of object member is affected by the generation and destruction of the object; that is, it is generated when the object is generated, and is destroyed when the object is destroyed.

Object members are classified into public members and private members. A "public member" is a member that can be referenced by other objects, while a "private" member is a member that cannot be referenced is (hidden) from other objects. As described above, members are classified into member objects and member functions. When this classification is combined with the public/private classification, object members are classified into four types: "public member object", "private member object", "public member function", and "private member function".

FIG. 4 is an example of class information that is coded according to the format shown in FIG. 3. In this figure, an asterisk (*) is a symbol indicating a pointer-type object, which consists of data used to refer to an object that is not any of its members. This object is referred to as a "pointer type" object because it points to another object. More specifically, the data of this pointer type object is the load module address of another object to which this object refers.

That is, in an object-oriented program, a plurality of objects cooperate with each other to execute the entire program by performing operations on other objects through this pointer type object.

"name of class and variable or global variable that can reference this class" in FIG. 3 is the reverse of the above; that is, it indicates the name of a class or variable or the name of global variable which uses this class as a member object or pointer-type object.

1-2-4. Breakpoint Setting in Constructor/Destructor Functions

Then, the breakpoint setting section 16 sets a system breakpoint in the function which generates an object (called "constructor" or "constructor function" in this specification) and in the function which destroys an object (called "destructor" or "destructor function" in this specification). A system breakpoint, which is similar to a normal breakpoint, is set regardless of user specification. When control reaches a system breakpoint, the specified procedure is executed. However, unlike a normal breakpoint, a system breakpoint does not wait for the user to enter commands.

That is, an object is generated from a class or is destroyed during the execution of a program. More specifically, an object is allocated in memory or is erased. The generation and destruction of an object is done by calling a constructor and destructor. It is very important during debugging to keep the user well informed of the fact that a constructor or destructor is called.

In an object-oriented programming language, it is easy to find a constructor function and destructor functions because their names are known. For example, in C++, a function with a name identical to the class name is a constructor function; in another language named Eiffle, a function with the name "Create" is a constructor function.

When a class inherits another class, the constructor and destructor of the base class are also inherited just like normal member objects and member functions. However, at the same time, the constructor and destructor defined in the child class are also executed. Therefore, when an object is generated, not only the constructor of the class used as the template but also all the constructors of indirect base classes are called; conversely, when an object is destroyed, not only the destructor of the class used as the template but also all the destructors of indirect base classes are called.

1-2-5. Execution of Load Modules

When the user instructs the execution of a program via the user interface section 6, the execution section 12 executes the program. At this time, the user can also specify the single-step execution of the program; if he does so, the program stops each time one step is executed to allow the user to reference various types of information via the user interface section 6.

1-2-6. Extraction of Object Information

When a load module is executed, the object information generation section 13 extracts and generates object information about object generation and destruction based on execution information about program executed obtained from the execution section 12 (for example, execution addresses or the contents of registers, etc.), and then this object information is stored in the object information storage section 14. That is, because breakpoints are set in all the constructors and destructors as described above, the break processing section 18 stops the execution of the program whenever an object is generated and destroyed during the execution of the load module, and starts the object information generation section 13. After recording the contents of object generation and destruction, the object information generation section 13 causes the execution section 12 to restart the execution of the program.

Figure 5:
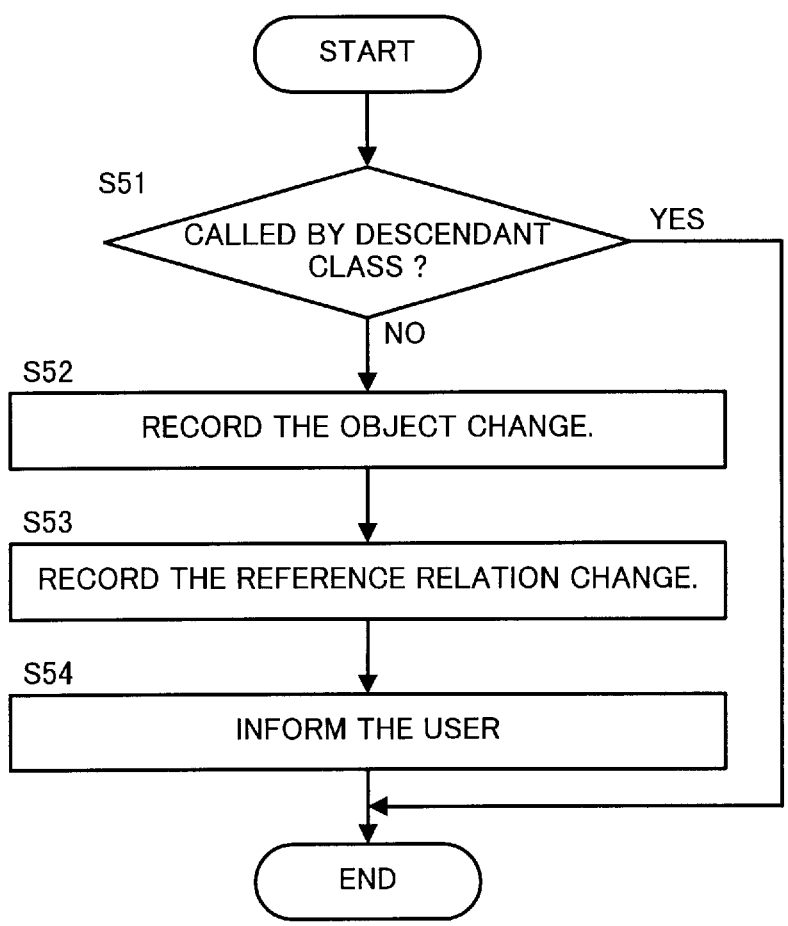
FIG. 5 is the flowchart showing the object information generation procedure for the debugger in embodiment 1 of the present invention.

FIG. 5 is the flowchart showing the object information generation procedure. That is, in this procedure, a check is made to see if the constructor or destructor is called by the constructor or destructor of a descendant class (step 51) and, if not, the change in the object is recorded (step 52). That is, when an object is generated, the start address at which the object is allocated as well as the object identification number (ID) are recorded. When an object is destroyed, the above information about the destroyed object is deleted.

Then, the change in the reference relation associated with the change in the object is also recorded. That is, when an object is generated, the object that called the constructor is recorded in the object information of the generated object as an object that can be referenced; conversely, when an object is deleted, the deleted object, that has been recorded as an object that can be referenced, is deleted from the object information. When an object is generated or destroyed in the debugger in embodiment 1, information about the generation or destruction is sent to the user via the user interface section 6 (step 54).

In the beginning, only the object that generated an object can reference that object. However, the object that generated an object may transfer the access right to another object during program execution. In an object-oriented program, this is done by the function which transfers the address pointing to the generated object. Therefore, when the execution section 12 executes this function, the object information generation section 13 records the transfer of the access right.

Figure 6:
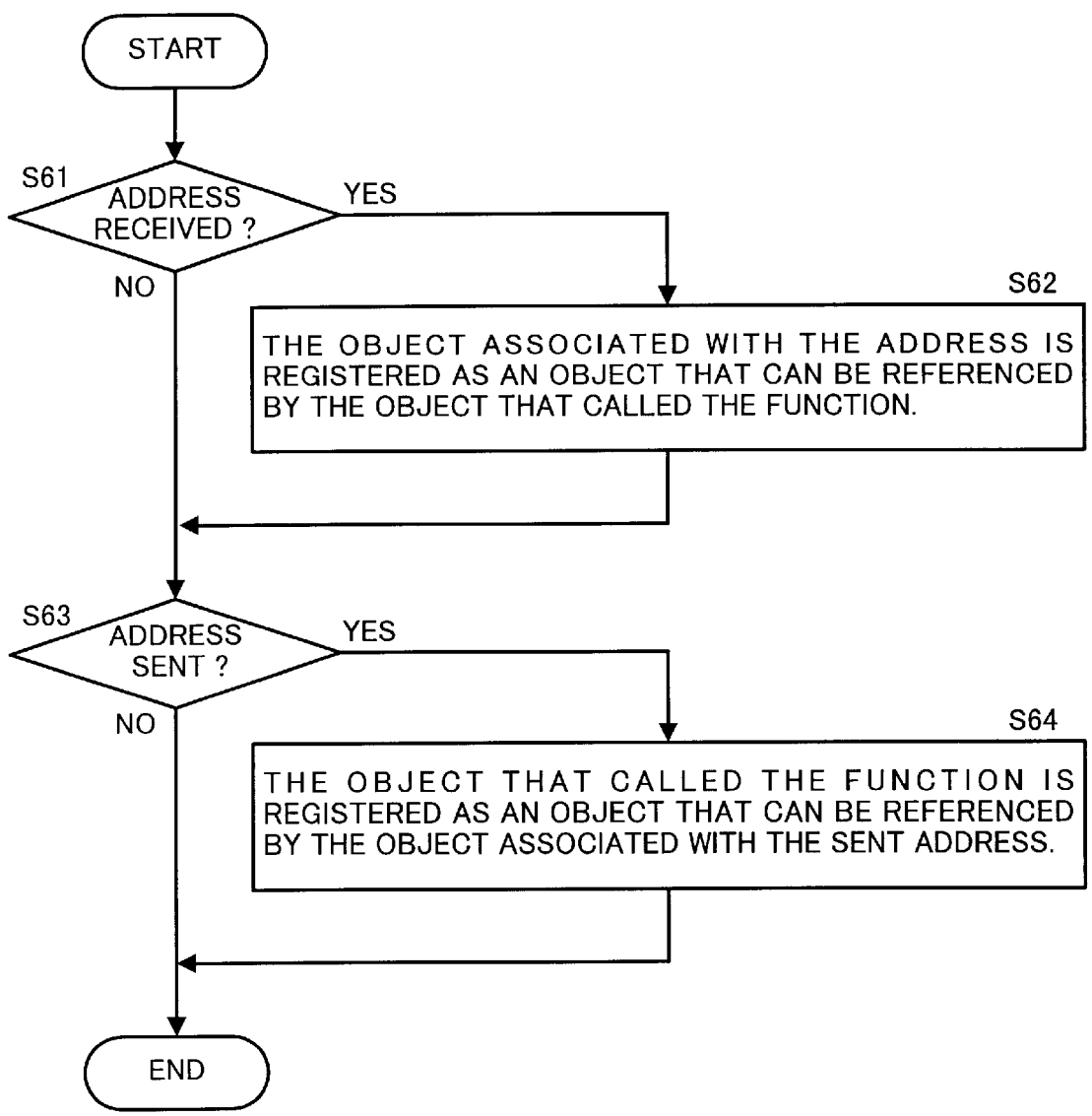
FIG. 6 is the flowchart showing the object information generation procedure when access is made to the object address transfer function in the debugger in embodiment 1 of the present invention.

That is, FIG. 6 is the flowchart showing the recording procedure for transferring the access right when the address transfer function is executed. That is, in this procedure, when an object calls a function which receives the address of an object (step 61), the object associated with the address is registered as an object that can be referenced by the object that called the receiving function (step 62). When an object calls a function which sends the address of an object (step 63), the object that called the sending function is registered as an object that can be referenced by the object to which the address was sent (step 64).

FIG. 7 shows the general format of object information that is generated and recorded as described above in the debugger in embodiment 1. FIG. 8 shows an example of object information.

In this example, the object ID identifying an object, an object start address, and the class name, variable name, and object ID of a member object are registered. In addition, the member object of an object as well as the object of an inherited base class are also registered as independent objects. For example, an object whose characteristics are "ID is 11, allocated address is 8000 0000(hex), String type str as its member object (ID=12), integer typex(ID=18)" is registered as a class A object. The string type object 12 is registered also in the String part.

The user can reference object information and reference relation information, which will be described later, at any time by performing the specified operation via the interface section 6.

1-2-7. Creation of Reference Relation Information

The user can obtain reference relation information representing the reference relation among objects, which is created through pointer-type objects and member objects, by performing the specified operation via the user interface section 6. That is, when the user enters an instruction through the user interface section 6, the reference relation information generation section 15 generates reference relation information at user instruction entry time based on object information, and outputs reference relation information via the user interface 6.

Reference relation information includes the objects that can reference a central object specified by the user and the objects that can be referenced by the central object. The user can display the reference relation of not only one object but also all the objects. The user can also obtain information about a change in the object reference relation each time it changes.

Figure 18:
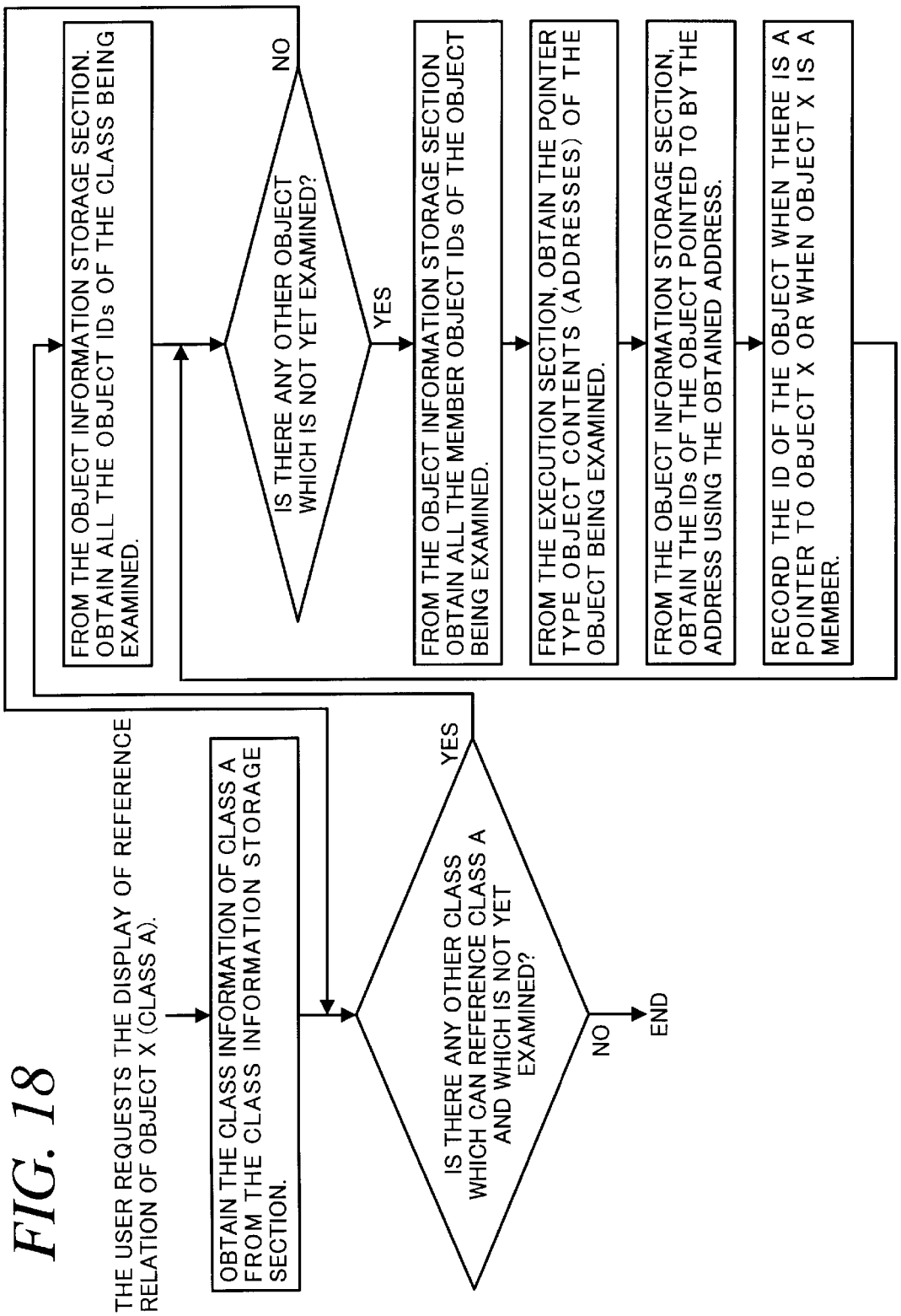
FIG. 18 is the flowchart showing the reference relation information generation procedure for the debugger in embodiment 1 of the present invention.

FIG. 18 is the flowchart showing the procedure for generating reference relation information. That is, this procedure identifies the classes that can reference a central object as well a s the classes that can be referenced by the central object based on class information, examines the addresses of the objects corresponding to these classes based on object information, and then obtains the ID of each of these objects via the execution section 12. Note that object addresses include addresses pointed to by pointer-type objects which are the member objects of the central object. And, by examining these addresses, the ID of an object that can be referenced by a pointer-type object can be obtained.

Break processing or event recording for each object is performed, as necessary, based on various types of information such as execution information and reference relation information (and class information if the class inherits another class).

1-2-8. User Breakpoint Setting

The user can set a breakpoint on an object basis. That is, when the user specifies an object, where a breakpoint is to be set, via the user interface section 6, the breakpoint setting section 16 sets a breakpoint in that specified object. As in a conventional debug system, the user can also specify only an address to set a breakpoint that is applied to all objects.

The user can set a breakpoint at a desired location in an object through the breakpoint setting section 16. That is, in the debugger in embodiment 1, the user can set one of two types of breakpoint: object-type breakpoint and (object-specified) address-type breakpoint. An "object-type breakpoint" is used to break the execution of a user-specified object when an operation is performed on the object, while an "address-type breakpoint" is used to break the execution of an object when control reaches a user-specified location in a user-specified object (that is, at a location in a particular member function or in a particular location in an inherited member function).

Therefore, in the debugger in embodiment 1, the user can set a breakpoint only in a function or at an address within the object whose behavior is to be checked. Then, the breakpoint does not break the execution of the program unless control reaches the corresponding address, increasing debugging efficiency.

When the user selects an object-type breakpoint, the breakpoint setting section 16 sets a breakpoint in all the public functions of the class and of the indirect base classes. The member functions associated with an object include those member functions of the class which is used as the template of the object, as well as those member functions of the indirect base classes. By setting breakpoints in all those functions, the user can determine whether a break occurs when one of those functions is called. That is, in the debugger in embodiment 1, two elements (address and object ID) are used to implement breakpoint setting on an object basis.

When the class of the object inherits other multiple-level classes via the base class, breakpoints are set, using this inheritance relation, in all the public member functions in all the classes which are inherited.

Figure 9:
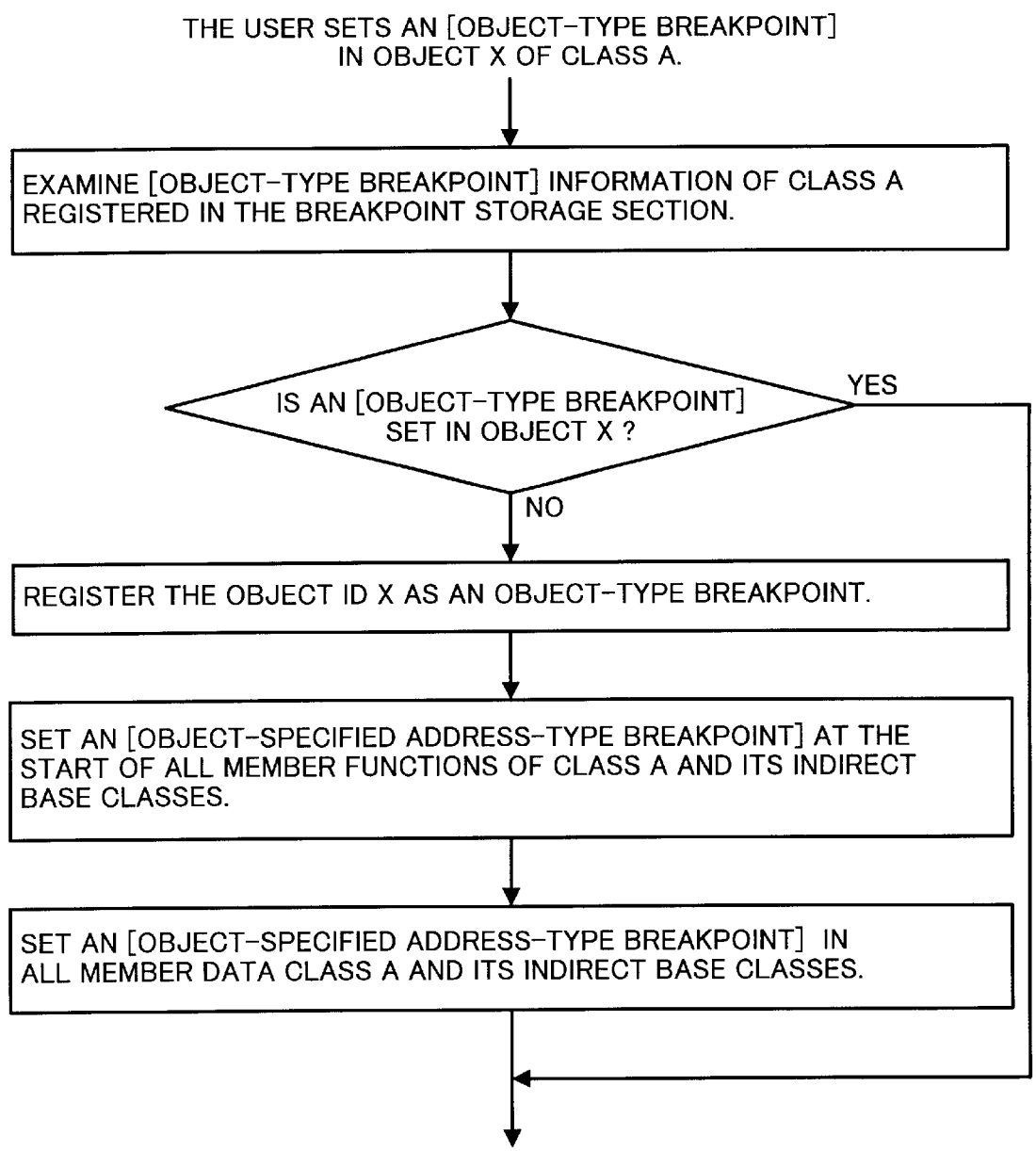
FIG. 9 is the flowchart showing the object-type breakpoint setting procedure for the debugger in embodiment 1 of the present invention.

When the object where a breakpoint is set has a public member object, the member object may also be referenced by the object and, therefore, an object-type breakpoint is set also in the member object. That is, if the referencing object has the address data of the member object, a breakpoint is set also in the part of the object where operation on the member object is performed. FIG. 9 is the flowchart showing the general procedure for setting an object-type breakpoint.

Figure 10:
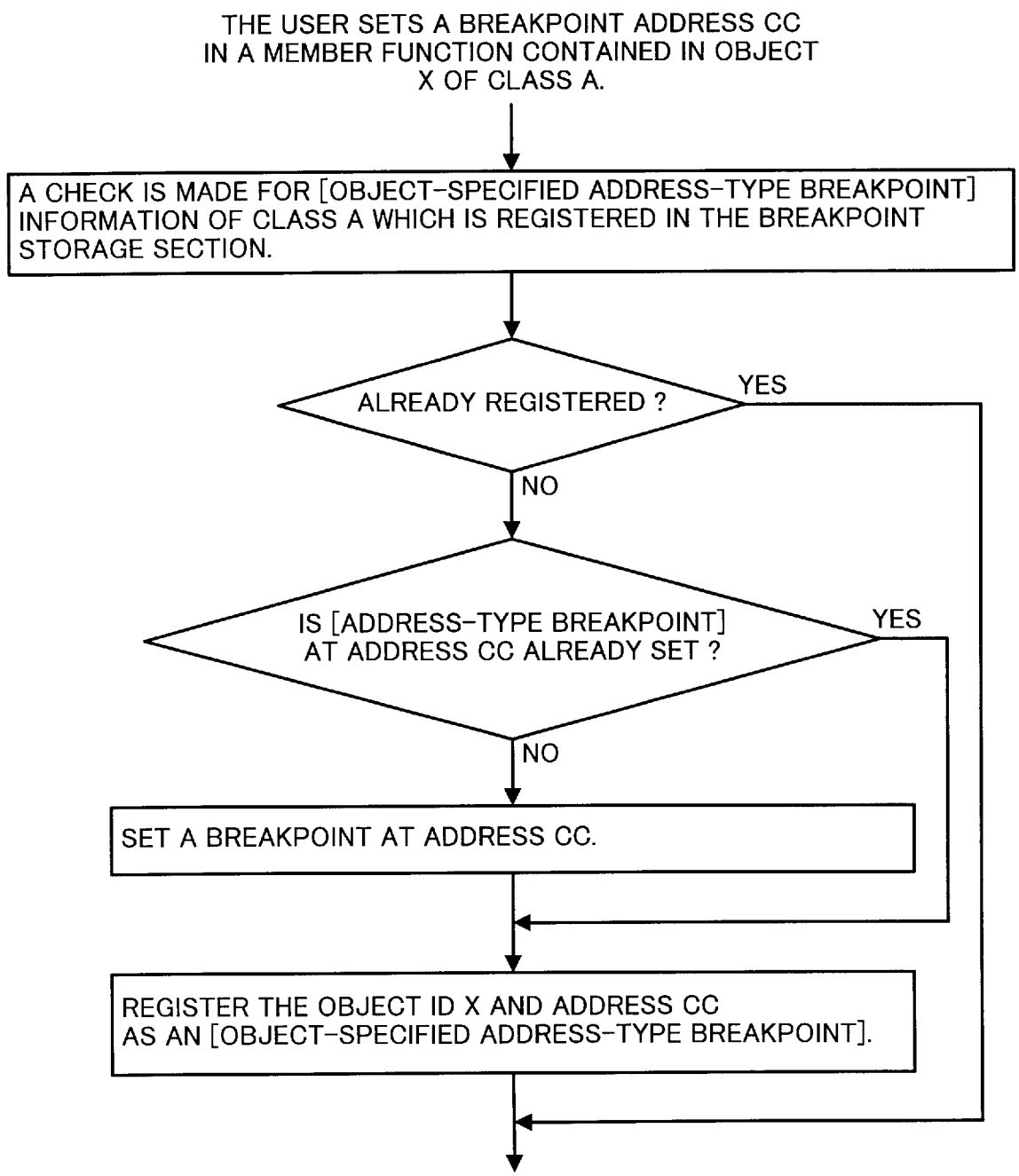
FIG. 10 is the flowchart showing the address-type breakpoint setting procedure for the debugger in embodiment 1 of the present invention.

FIG. 10 is the flowchart showing the procedure for setting an address-type breakpoint. In this procedure, a check is made to see if the address and the object are already registered. If both the address and the object are already registered, no processing is performed; if the address is not yet registered, a breakpoint is set and is registered; if the address is registered but the object is not yet registered, only the breakpoint is registered.

FIG. 11 shows the general format of breakpoint data, and FIG. 12 is an example of breakpoint data. In this example, the ID of the object where an object-type breakpoint is set (ID=11 of class ClassA), the location of an address-type breakpoint that is set at the start of the member function (printA( ) start address 2000 4000 (Hex) etc.), and the ID of the object to be referenced (ID=11, etc.) are registered. Because an object-type breakpoint is set in the class ClassA object (ID=11), an object-type breakpoint is also set automatically in the string type object (ID=12) which is its member.

1-2-9. Event Point Setting

The user sets an event point in an object via the breakpoint setting section 16. When control reaches an "event point", the contents of processing at the specified location are recorded; the program itself does not stop. An event point is different from a user breakpoint in the effect at execution time, but is similar to a user breakpoint in the type and setting procedure. That is, like a user breakpoint, there are two types: object-type and address-type. For each type, an event point may be set just as a user breakpoint. The user can also specify only an address to set an event point that is applied to all objects.

FIG. 13 shows the general format of event point data, and FIG. 14 is an example of data. In this example, an object-type event (object ID=12) and an address-type event (object ID=154) are registered.

1-2-10. Break Processing

The break processing section 18 monitors the execution address of a load module and, upon detecting the address where a breakpoint is set, temporarily stops the execution of the program and determines whether the break condition is satisfied. That is, based on class information and execution information, the break processing section 18 checks if the break has occurred in the object where a breakpoint is set.

Figure 15:
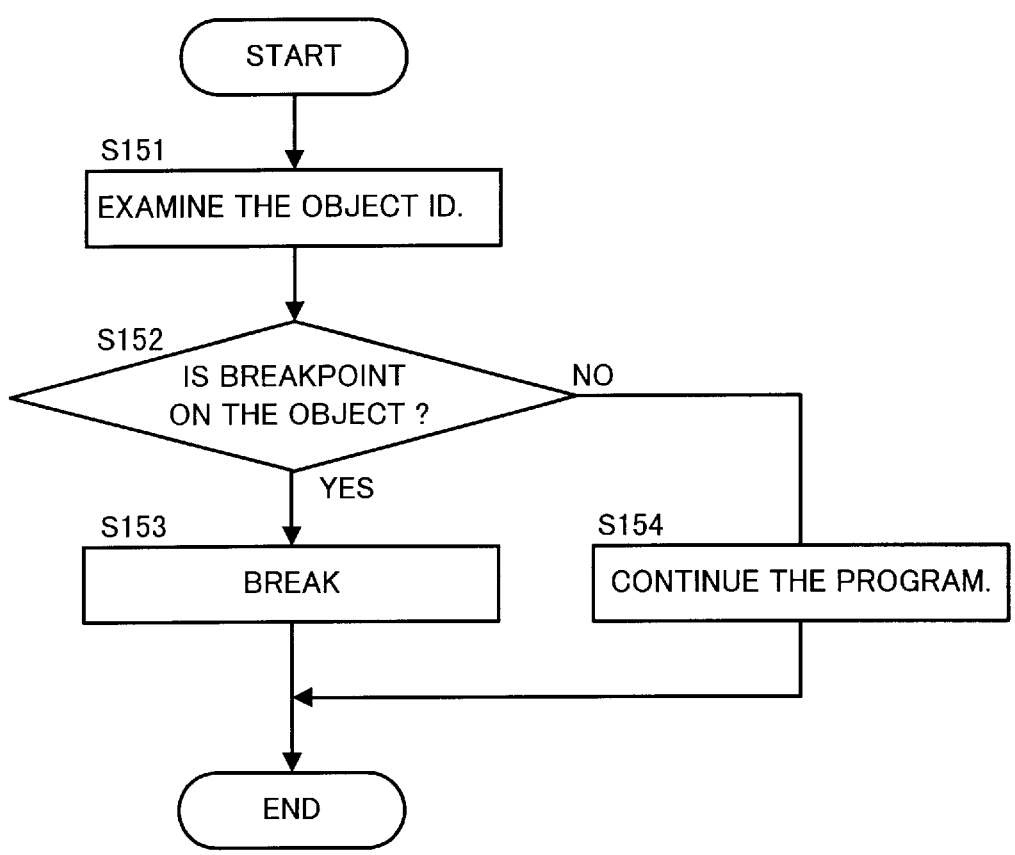
FIG. 15 is the flowchart showing the processing procedure that is used when control reaches a breakpoint that is set in a public member function of the class and its indirect base class in the debugger in embodiment 1 of the present invention.

When a breakpoint is detected in a public member function in the class of the object or in its base class, the ID of the object that is in operation at break time is examined (step 151) via the execution section 15, as shown in FIG. 15 (flowchart). If the object ID is registered (step 152), control is passed to the user interface section 6 with the program stopped (step 153); if the object ID is not registered, the program is restarted (flowstep 154).

Figure 16:
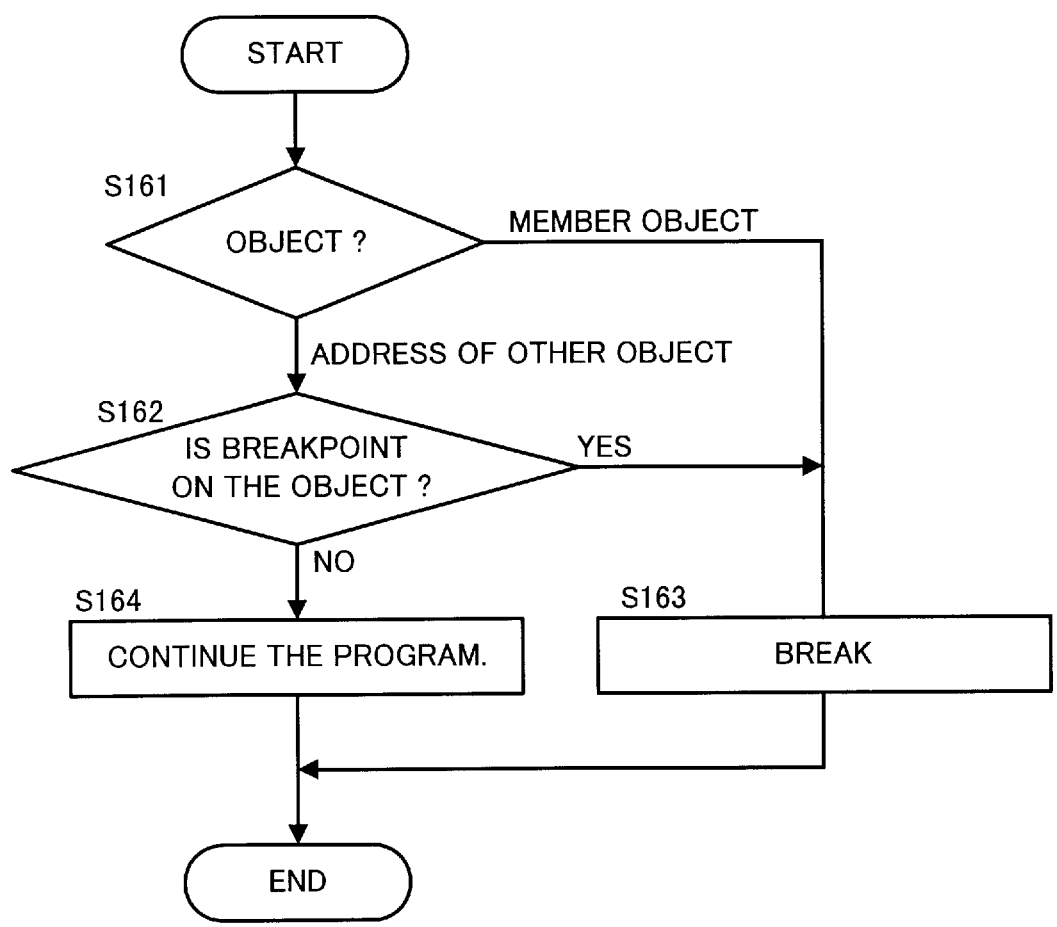
FIG. 16 is the flowchart showing the processing procedure that is used when control reaches a breakpoint in a public member in the debugger in embodiment 3 of the present invention.

FIG. 16 (flowchart) shows processing to be performed when the program stops on a breakpoint that is set in public member data. In this case, a check is made for the type of the object associated with the breakpoint (step 161). If the object has access rights and is a member object, a break occurs (step 163) and the user interface section 6 is started. If the object is stored as address data in an object that can be referenced, a check is made for the address if it corresponds to the object where the breakpoint is set (step 162). If it is, a break occurs (step 163); if it is not, the program is restarted (step 164).

Figure 17:
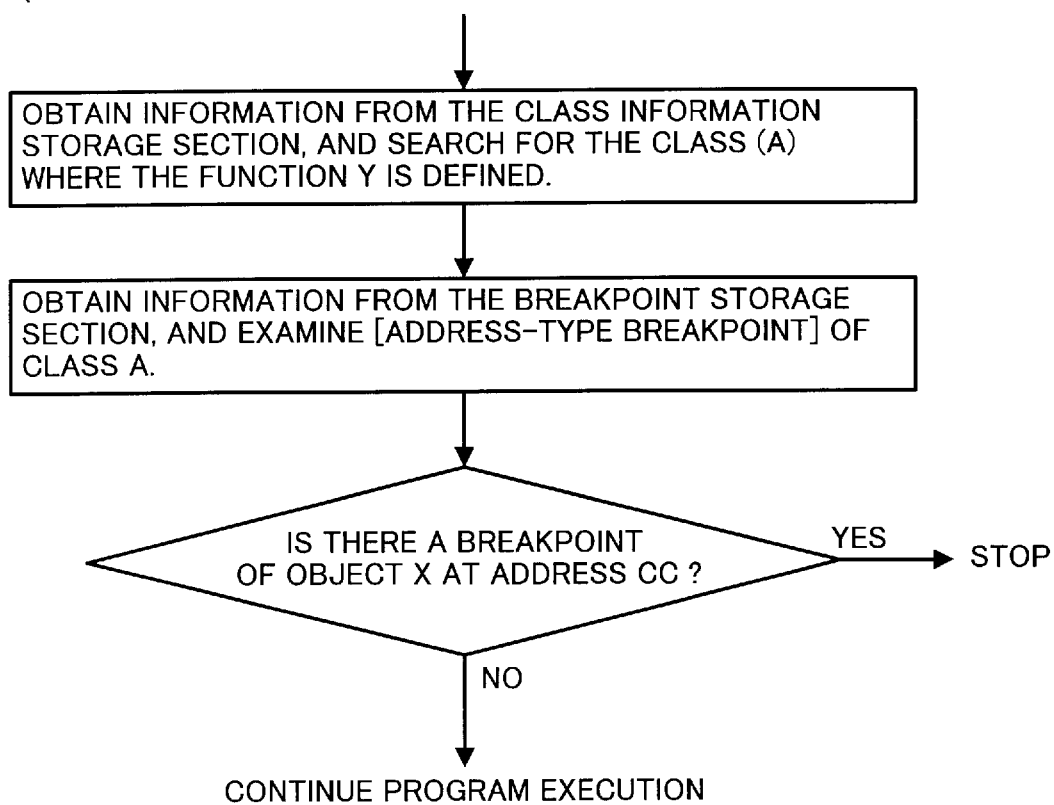
FIG. 17 is the flowchart showing the break processing for an address-type breakpoint in the debugger in embodiment 1 of the present invention.

FIG. 17 shows the procedure for the break processing for an address-type breakpoint.

1-2-11. Event Recording

When the break processing section 18 detects an event point, it starts the event information generation section 19. The event information generation section 19 extracts and generates event information, such as the contents of operation on the object, based on the execution information, and stores the extracted and generated information in the event information storage section 20. After information extraction, the event information generation section 19 starts the execution section 12 and restarts the program.

The general format of event information is:

(target object ID, function address)

Examples are:

(154, 2000 3000)

(12, 2000 3310)

In this example, the ID of the object where event processing was performed, the ID of the object which attempted object operation, and the address of the function used in the operation are recorded. That is, an event in which the String type object [12] was processed by the member function [2000 3310] is recorded.

When a plurality of types of point are set at the same time, the break processing section sequentially starts the processing section for the points in this sequence: system breakpoint, event point, and user breakpoint.

1-3. Effect of Embodiment 1

As described above, the debugger in embodiment 1 generates and outputs class information representing the structure of classes within a program to make the class structure easier to understand. The debugger in embodiment 1 also generates and outputs object information to make the object status easier to understand. This allows the user to debug a program while viewing object status data such as object generation and destruction status, and makes it easy to debug a program with a particular object in mind. In addition, the debugger in embodiment 1 outputs the reference relation information representing the reference relation among objects, enabling the user to obtain information about objects having a reference relation with the object the user wants to debug.

The debugger in embodiment 1 allows the user to set a breakpoint in a desired object, to stop program execution on the breakpoint, and to debug a particular object. In addition, the debugger in embodiment 1 records the history of execution contents of an object where an event point is set. This enables the user to trace the behavior of the program with attention on a particular object.

The debugger in embodiment 1 sets a breakpoint in a member of the base class of the setting object. When the member is referenced, the user can determine whether it is the object he intended or not. Therefore, even if there is an inheritance in object-oriented programming, the user can break program execution on an object basis.

As described above, the debugger in embodiment 1, which helps the user perform object-based debugging, makes it easier for him to debug a program with attention on a particular object, ensuring debugging efficiency in object-oriented programming.

2. Embodiment 2

Input/output operation on an object, for example the debug operation and the output of various types of information, may be performed in the source code based on the identifier corresponding to an object. In addition, the debug operation may also be reserved with the identifier of an object. The debugger in embodiment 2 has a structure to implement this type of debug operation. It is an object of embodiment 2 to provide a debugger which increases the efficiency of debugging.

Figure 19:
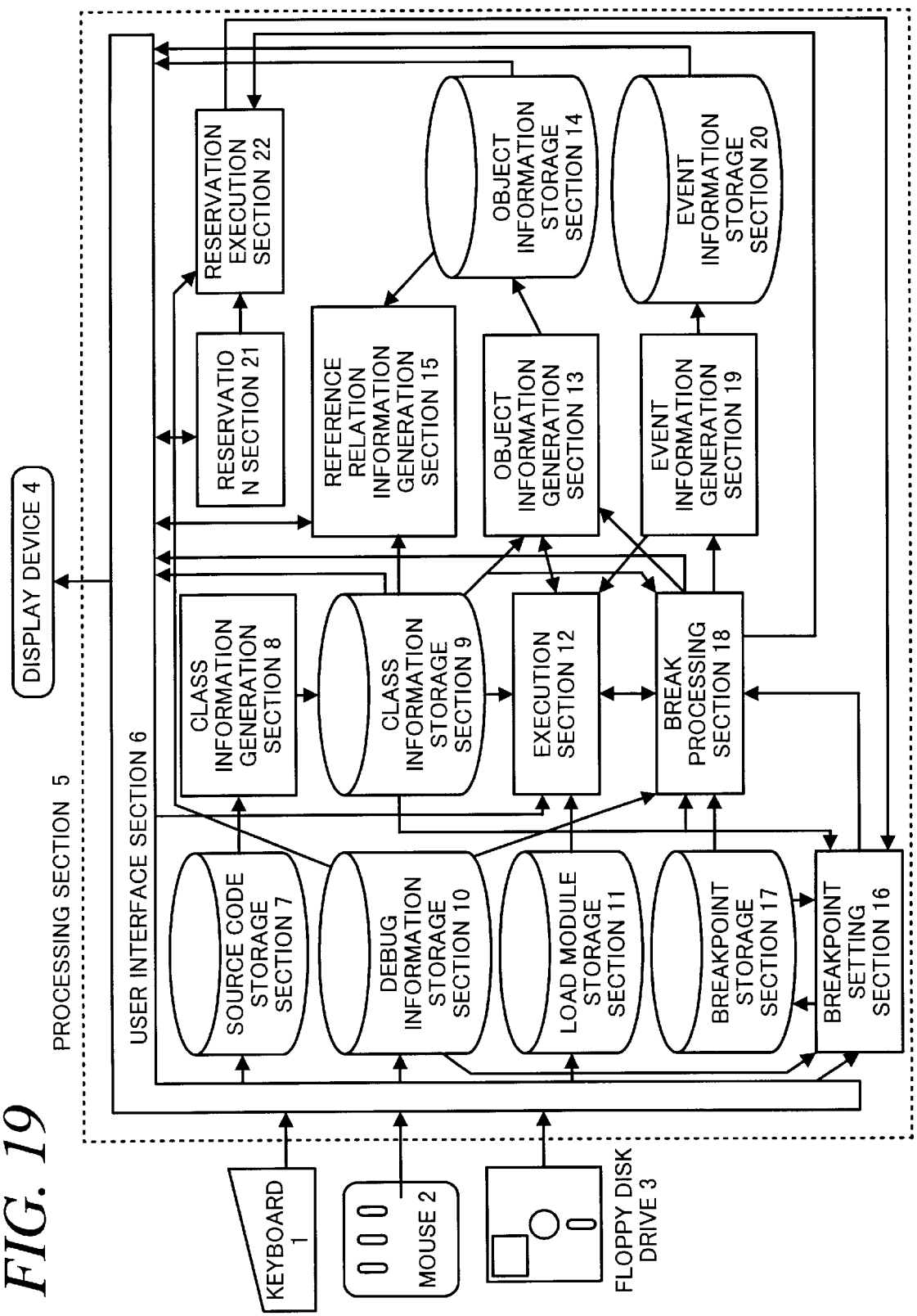
FIG. 19 is the functional block diagram showing the structure of the debugger in embodiment 2 of the present invention.

FIG. 19 is the functional block diagram showing the structure of the debugger in embodiment 2. As shown in this figure, the debugger in embodiment 2 is similar in structure to the debugger in embodiment 1, except that it has the reservation section 21 (corresponding to the reservation means) which reserves a desired debug operation with the identifier of an object as well as the reservation execution section 22 (corresponding to the reservation execution means) which performs reserved operation on the object when there is an object that can be referenced by the reserved identifier.

The debugger in embodiment 2 has the user interface 26 which performs input/output on each object based on the identifier corresponding to an object in the source code. In embodiment 2, debug data is entered, or various types of information is output, not only with the ID of the object internal to the system but also with the identifier corresponding to the object. This makes information easier to understand and the debug data easier to enter and, as a result, increases the efficiency of debugging.

2-1. Operation reservation

With the debugger in embodiment 2, the user can reserve a desired debug operation with the identifier of an object via the reservation section 21. That is, this type of reservation may be made before or during program execution. As an identifier, the user uses the identifier of a desired object in the source code. Identifiers are obtained as debug information. Debug operations such as breakpoint and event point setting can be performed as the user wishes. The contents of reservation are stored in the specified memory location.

FIG. 20 shows an example of reservation contents. In this example, the object is specified with the type and identifier, and the operation contents are described. For example, in line 2, an object-type breakpoint is set on the String type object "zoo→cat.name" which is a member of the cat type object.

2-2. Operation Execution

The reservation execution section 22 performs the reserved operation on the object when there is an object that can be referenced by the reserved identifier.

Typically, an object can be referenced with the reserved name in one of the following cases: 1 An object is generated with the reserved identifier. 2 An existing object can be referenced with the reserved name as the access right is transferred with a pointer-type object.

The following processing is performed to detect one of the above cases. That is, when the break processing section 18 detects that the object generation operation or the pointer-type object operation is performed during program execution, it informs the reservation execution section 22 that one of those operations is performed. When an object is generated, the reservation execution section 22 checks to see if the identifier of the object matches the reserved identifier and, if they match, performs the operation reserved for the identifier.

When the pointer-type object is executed, the reservation execution section 22 checks if an existing object can be referenced by the reserved identifier as the access right is transferred and, if it can be referenced, performs the operation reserved for the identifier.

Figure 21:
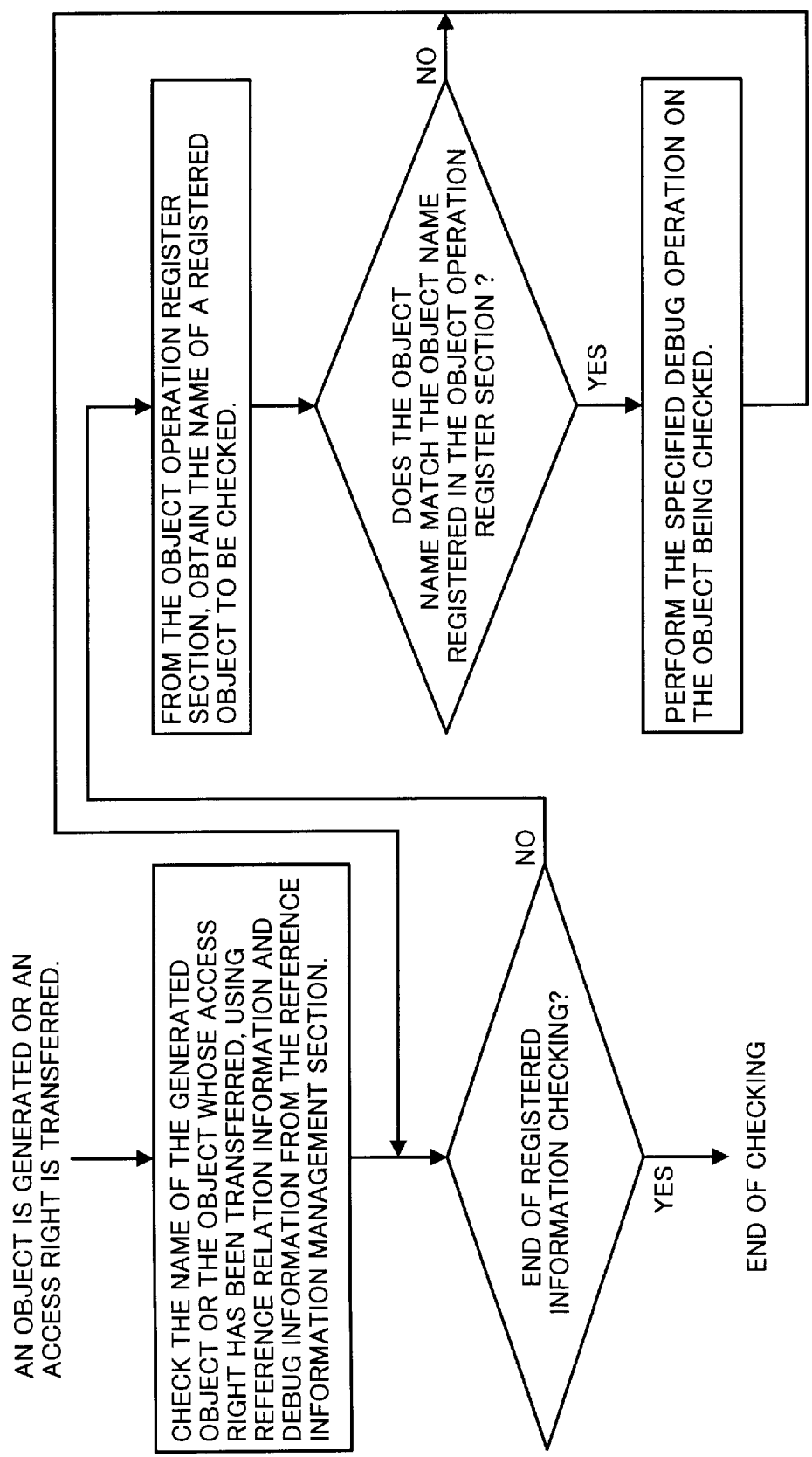
FIG. 21 is the flowchart showing the operation procedure for the reservation execution section in the debugger in embodiment 2 of the present invention.

This check is made using the reference relation information, execution information, source code, debug information, and so forth, and the actual operation is performed by identifying the object with the ID. FIG. 21 shows an example of reservation execution means operation procedure.

Figure 22:
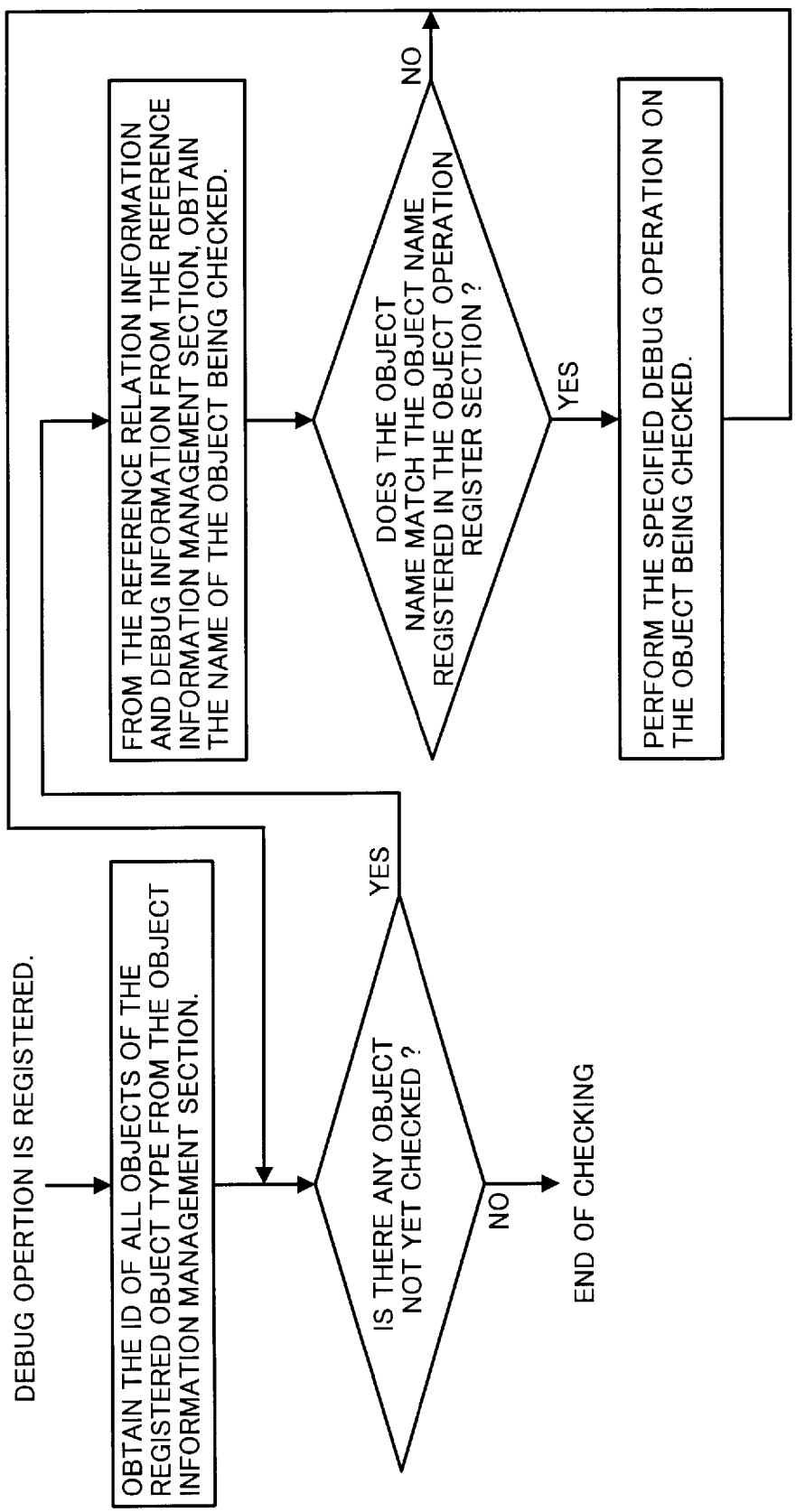
FIG. 22 is the flowchart showing the operation procedure for the reservation execution section in the debugger in embodiment 2 of the present invention.

The reserved operation may be executed immediately if there is an object with the reserved identifier at the reservation time. FIG. 22 shows an example of operation procedure for the reservation execution means that is executed in this case.

As described above, the debugger in embodiment 2 enables the user to reserve debug operations such as breakpoint setting with the use of an identifier before or during program execution. When there is an object that can be referenced by the reserved identifier, the operation reserved for the object is executed. This automates the debug operation to increase the efficiency of debugging.

3. Embodiment 3

The present invention may be implemented by displaying various types of information in one window or two or more windows using the multi-window display system. This display system may be used to display, in new windows, the information associated with the information currently displayed in the window. Various types of information is thus combined to let the user use it more efficiently.

Figure 23:
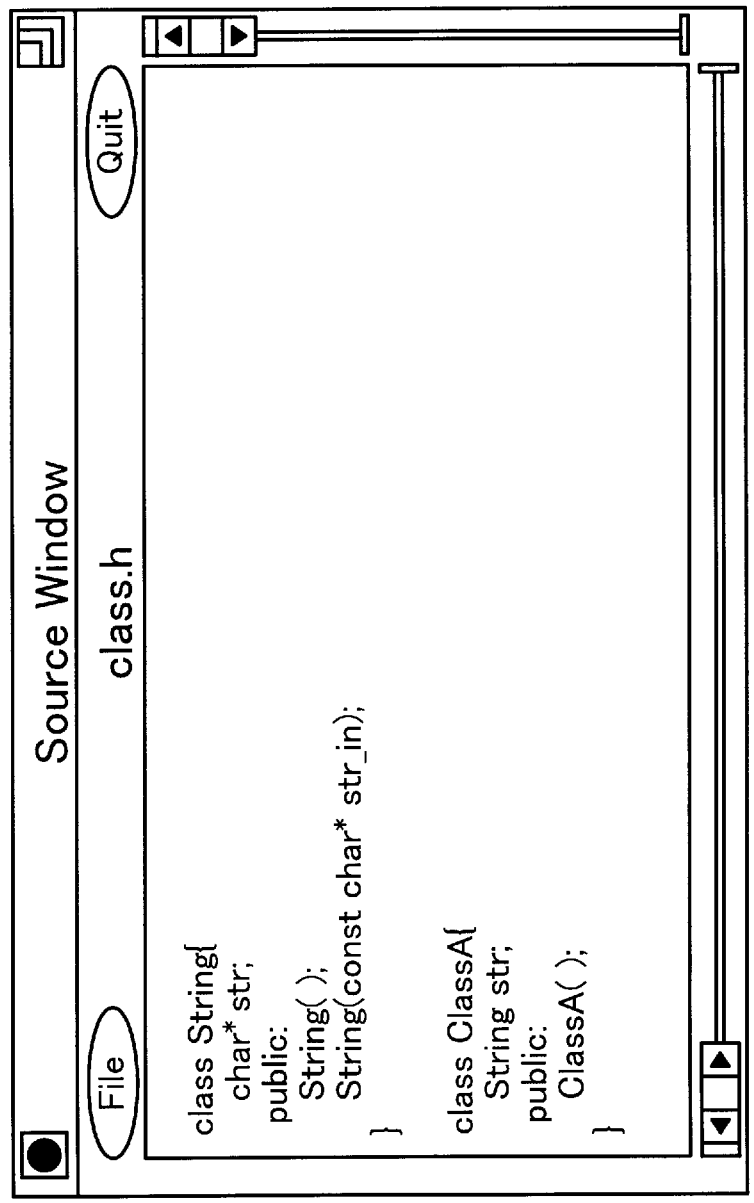
FIG. 23 shows an example of a window displayed by the debugger in embodiment 3 of the present invention.
Figure 24:
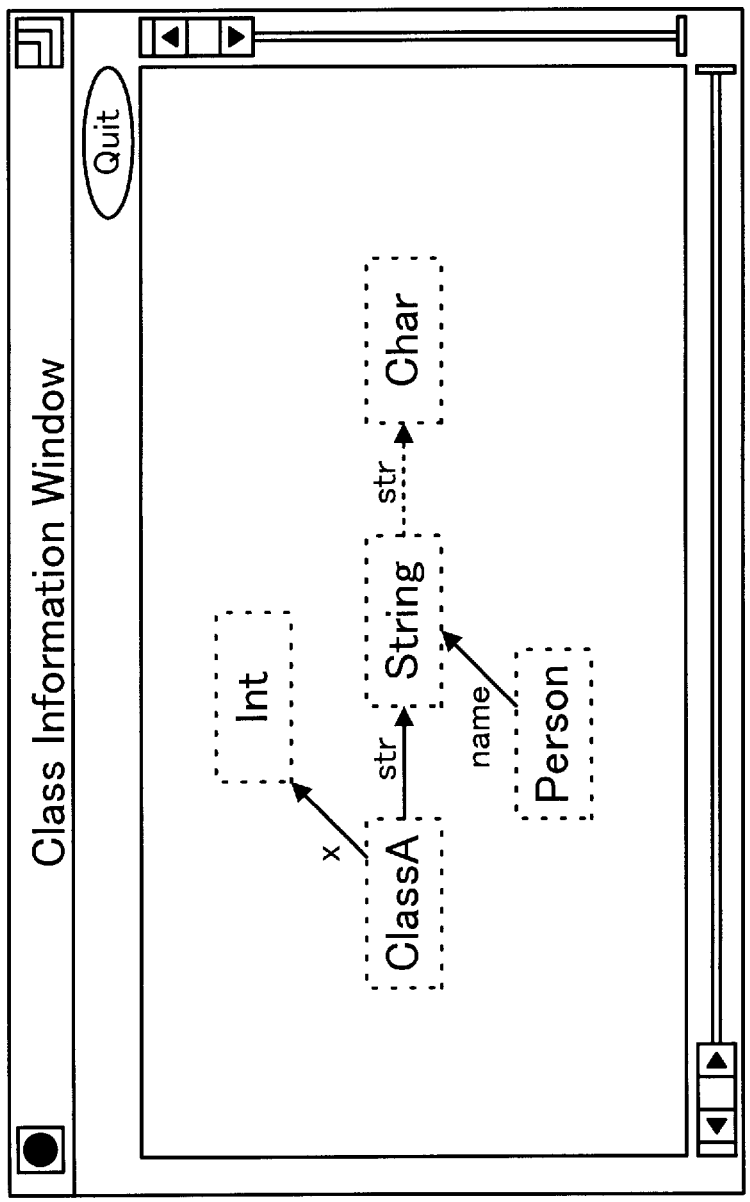
FIG. 24 shows an example of a window displayed by the debugger in embodiment 3 of the present invention.
Figure 25:
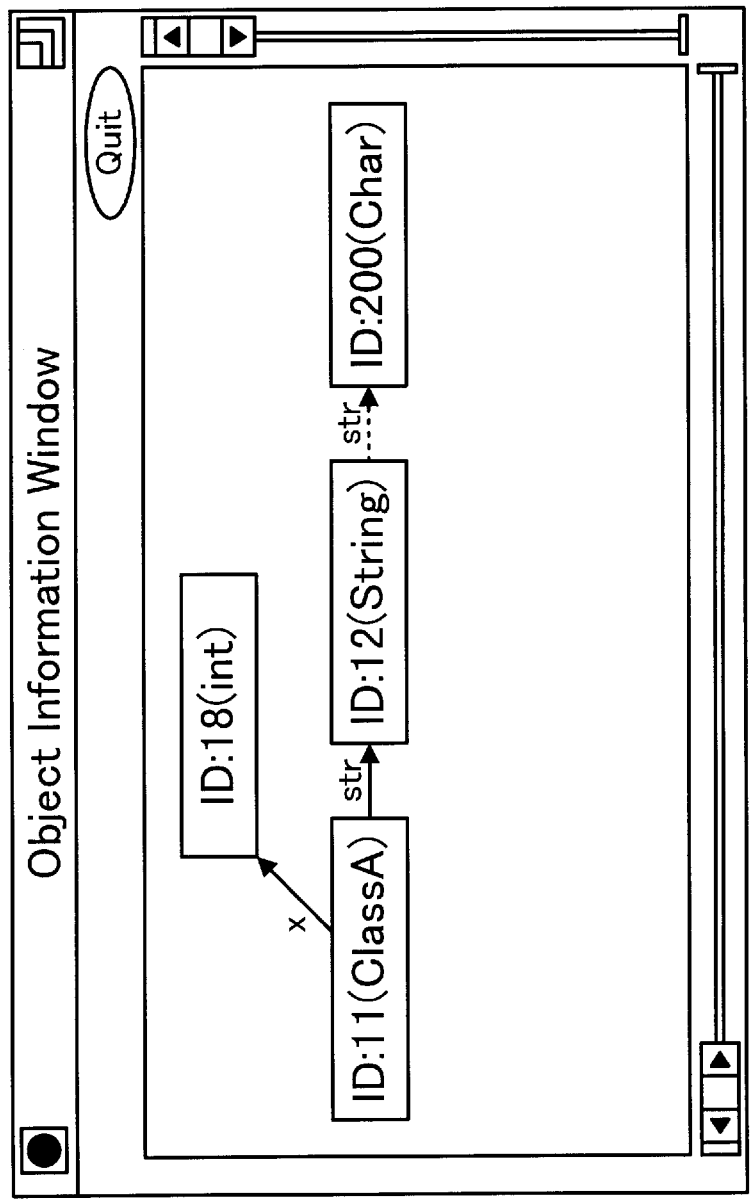
FIG. 25 shows an example of a window displayed by the debugger in embodiment 3 of the present invention.
Figure 26:
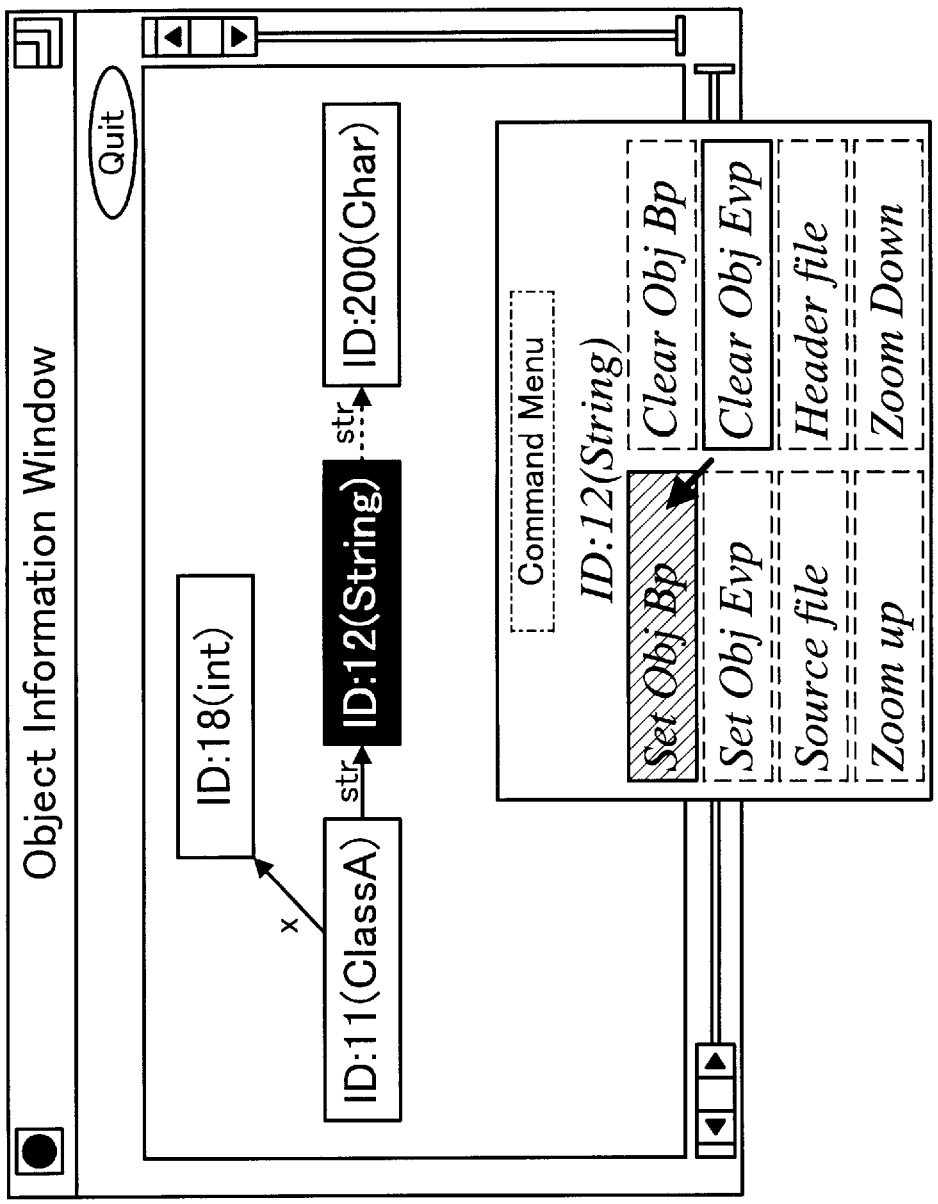
FIG. 26 shows an example of a window displayed by the debugger in embodiment 3 of the present invention.

For example, the source code (FIG. 23), class information (FIG. 24), and object information (FIG. 25) are displayed in separate windows. Operation on displayed information is done, for example, via a new window (FIG. 26).

Figure 27:
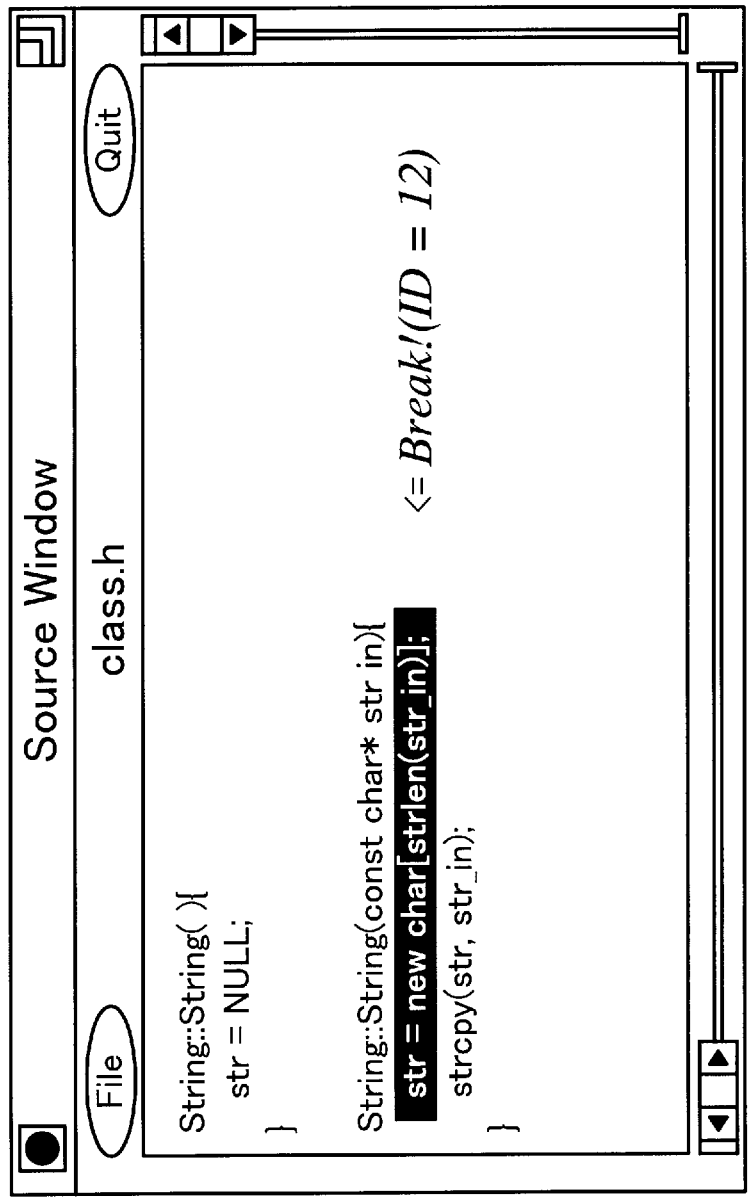
FIG. 27 shows an example of a window displayed by the debugger in embodiment 3 of the present invention.
Figure 28:
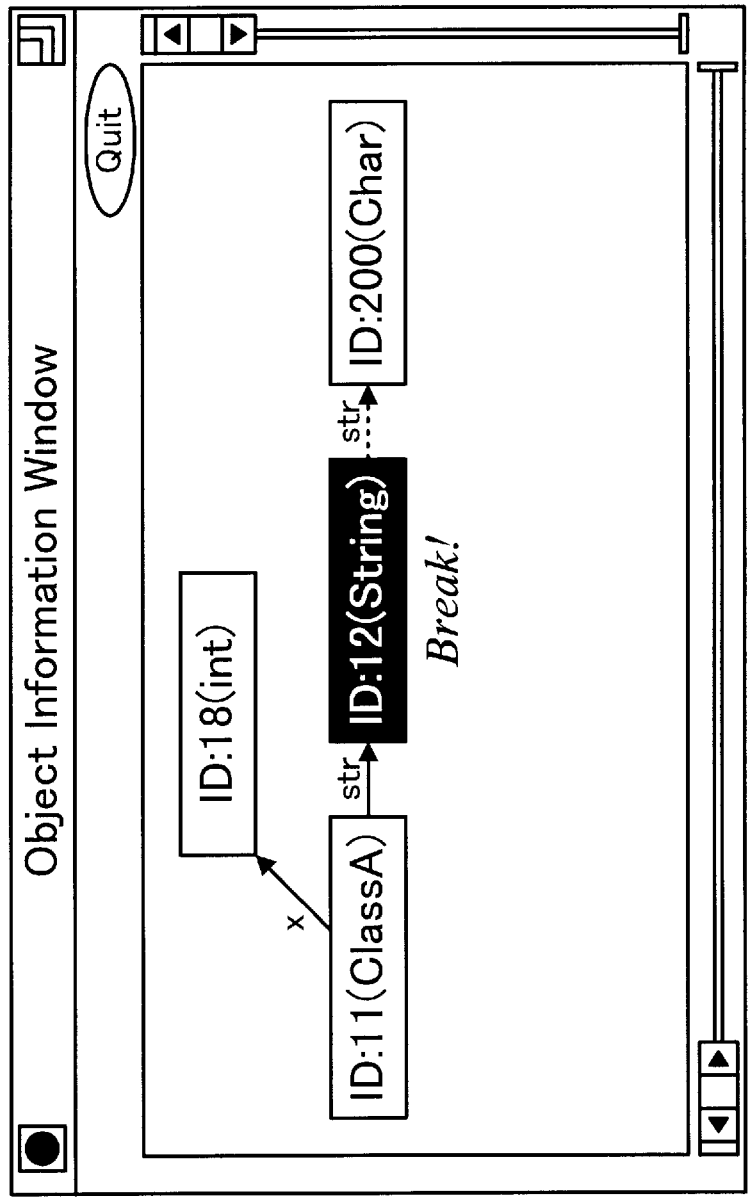
FIG. 28 shows an example of a window displayed by the debugger in embodiment 3 of the present invention.

In these windows, the source code associated with a breakpoint (FIG. 27) or information about an object on which a break occurs (FIG. 28) may be displayed. As in FIGS. 27 and 28, part of information may be displayed in reverse video to emphasize displayed information.

Figure 29:
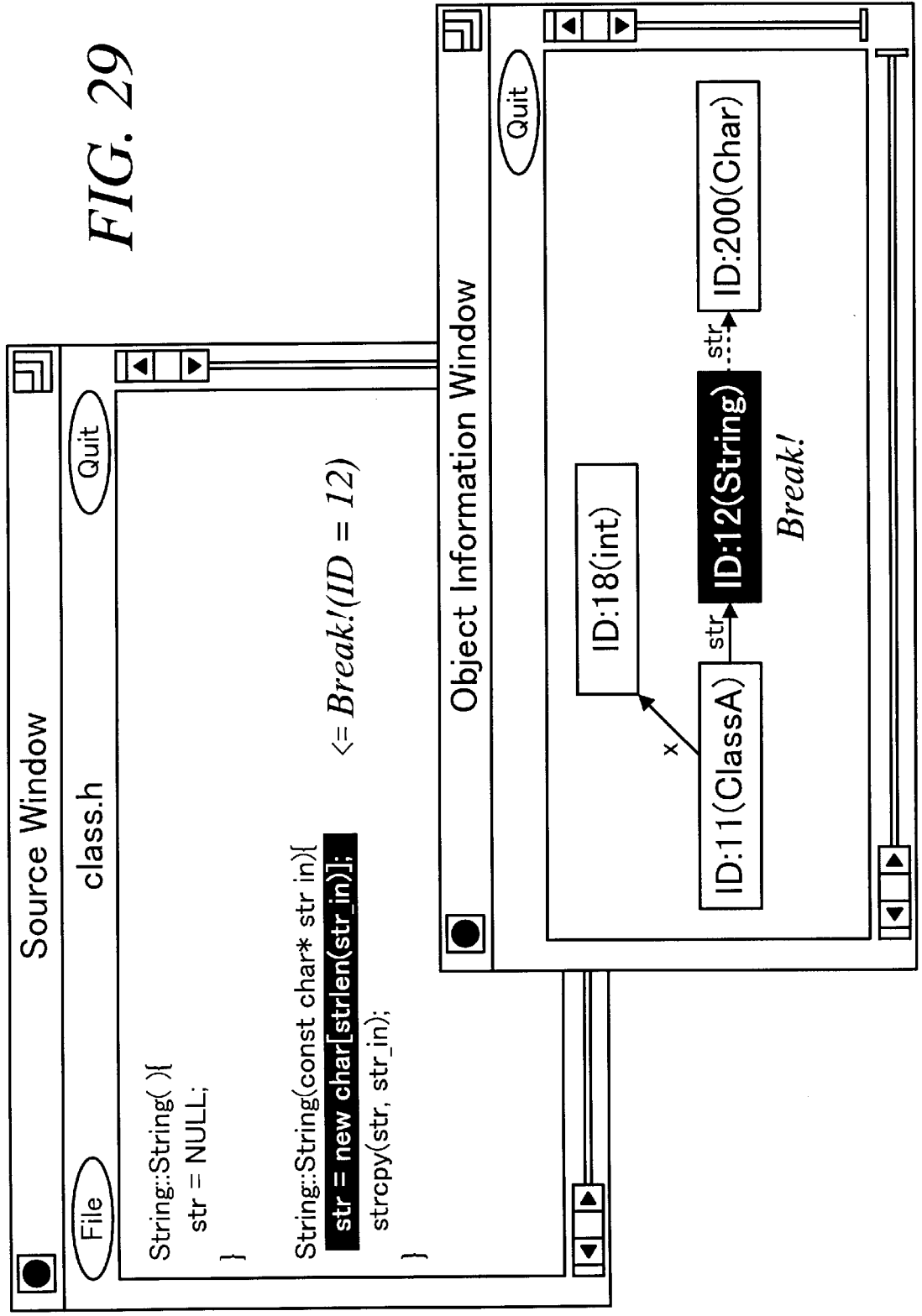
FIG. 29 shows an example of a window displayed by the debugger in embodiment 3 of the present invention.
Figure 30:
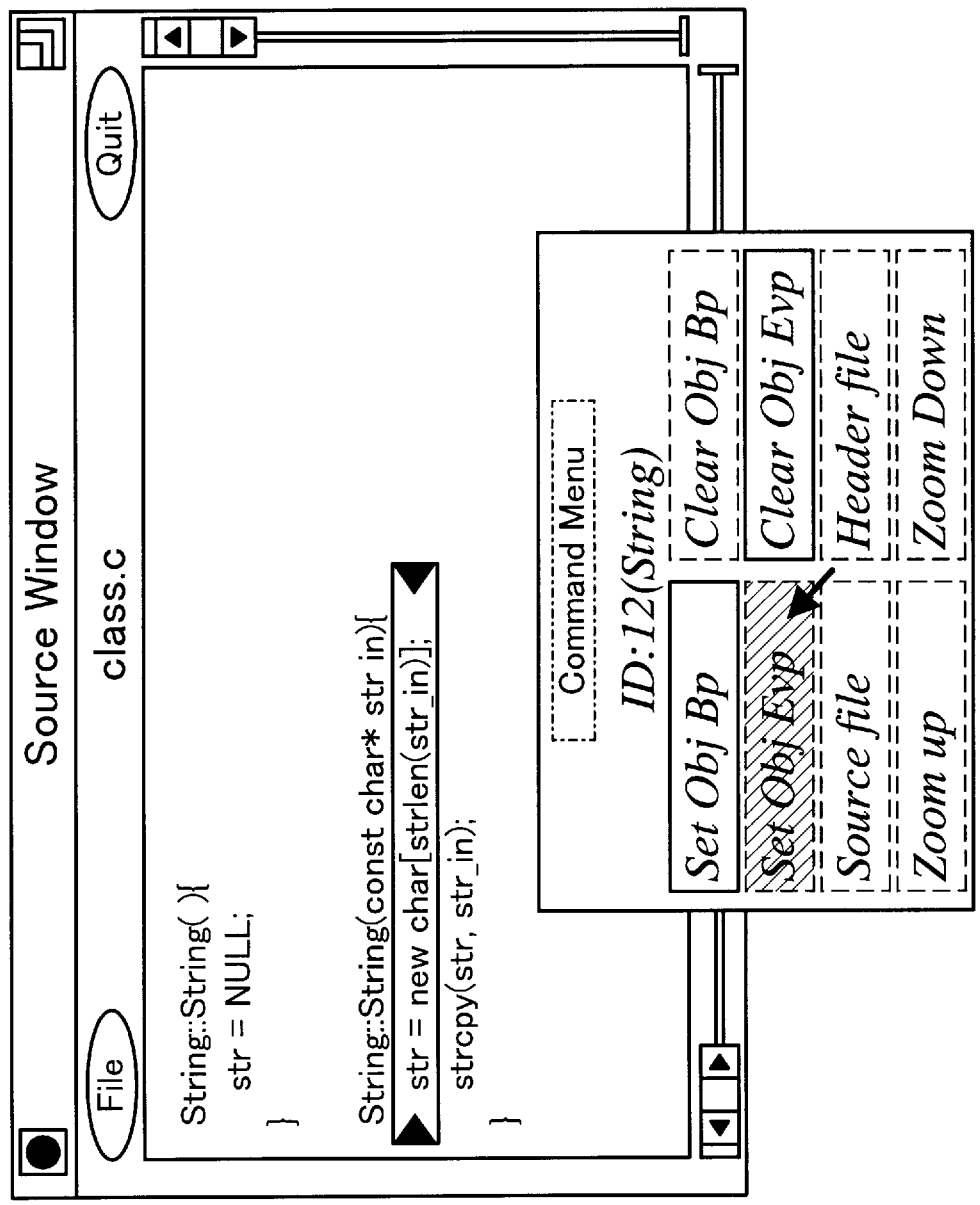
FIG. 30 shows an example of a window displayed by the debugger in embodiment 3 of the present invention.
Figure 31:
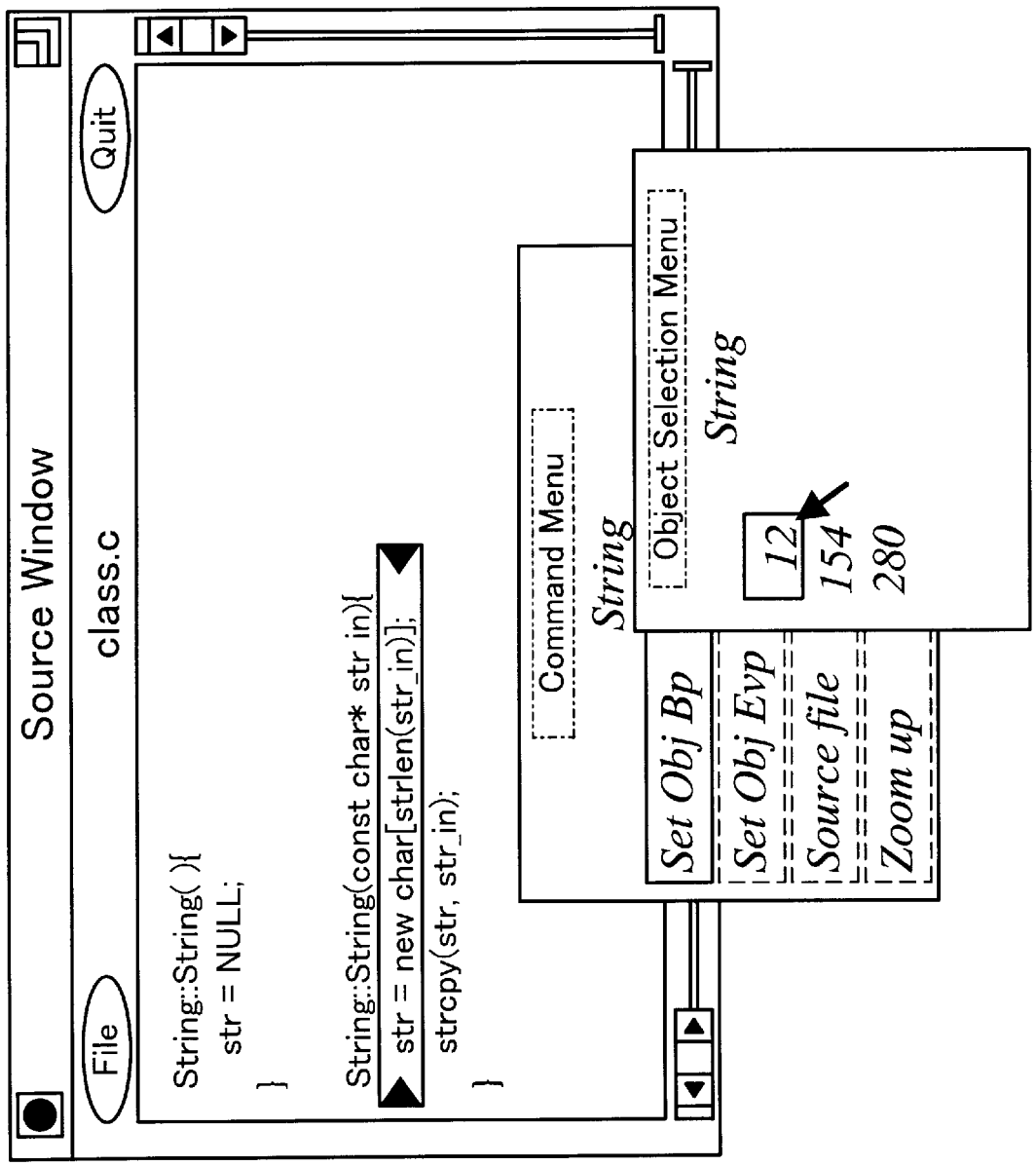
FIG. 31 shows an example of a window displayed by the debugger in embodiment 3 of the present invention.

In this type of multi-window system, the source code may be displayed in one window, and the corresponding object information in another window (FIG. 29). The system may also be built so that the user can set a breakpoint or event point in the object associated with the source code (FIG. 30). When the user sets a breakpoint in the object associated with the source code, a plurality of objects associated with the part of the source code may be displayed in another window to allow the user to select one of objects he wishes (FIG. 31).

4. Other Embodiments

The present invention is not limited to the above embodiments. Because the embodiments may be modified, they includes other embodiments described below. For example, the present invention may be applied to any object-oriented programming language. Information such as class information and object information may be displayed in any format. The type of breakpoints that are set in an object may be one type: object-type or address-type. Operation reservation and a multi-window display system are not always required.

INDUSTRIAL ADVANTAGES

As described above, the present invention provides the user with a debugger which helps him perform object-based debugging. This increases the efficiency and reliability in software development in object-oriented programming.

What is claimed is:

1. A debugger comprising:
   a class information generation means for generating class information representing a structure of plural classes which implement plural objects of a program to be debugged based on source code of said program to be debugged;
   an object information generation means for generating and recording object information including an object identification and a starting address for each object when each of said plural objects is created during an execution of said program;
   a breakpoint setting means for setting plural breakpoints according to said object information, each breakpoint being set at a breakpoint address corresponding to a specific object of said plural objects;
   an event point setting means for setting an event point in said specific object of said program;
   an event point detection means for detecting said event point according to the execution of said program; and
   an event information generation means for generating event information about the execution of said program at said event point.

2. A debugger as claimed in claim 1, further comprising:
   a reference relation information generation means for generating reference relation information representing reference relations among said plural objects based on said object information; and
   a reference relation information output means for outputting said reference relation information.

3. A debugger as claimed in claim 1, wherein said breakpoint setting means further comprises means for setting an address breakpoint in a location in said plural objects corresponding to one of said plural classes.

4. A debugger as claimed in claim 1, further comprising a user interface for performing input and output of debugging information for said specific object based on an identifier corresponding to said specific object in said source code of said program.

5. A debugger as claimed in claim 4, further comprising:
   a reservation means for reserving a debug operation using said identifier of said specific object; and
   a reservation execution means for automatically executing a reserved operation for said specific object when said specific object can be referenced with a reserved identifier.

6. The debugger as claimed in claim 1, wherein said event point setting means comprises an event point setting means for setting an event point at each public method of said specific object and for setting an event point at each public method of each public object of said plural objects contained in said specific object.

7. The debugger as claimed in claim 1, wherein said breakpoint setting means comprises:
   breakpoint setting means for setting plural breakpoints, each breakpoint being set at a first breakpoint address of each public method of said specific object, at a second breakpoint address of each public method of a base class of said specific object and at a third breakpoint address of a public method of at least one public object of said plural objects contained in said specific object.

8. The debugger as claimed in claim 1, wherein the means for generating and recording comprises means for recording which of said plural objects is created by another of said plural objects.

9. The debugger as claimed in claim 1, further comprising means for tracking access right information by tracking when said start address of said specific object is transferred to another of said plural objects.

10. The debugger as claimed in claim 9, wherein the breakpoint setting means comprises breakpoint setting means using said access right information to set said plural breakpoints.

11. The debugger of claim 1, wherein the break means comprises:
    break means for breaking the execution of said program at one of the breakpoint addresses regardless of which of said plural objects referenced said one of said breakpoint addresses;
    means for restarting the execution of said program without user intervention if said one of the breakpoint addresses is called by a one of said plural objects on which a one of said plural breakpoints was not set by said breakpoint setting means; and
    means for passing control to a user if said one of the breakpoint addresses is called by a one of said plural objects on which a one of said plural breakpoints was set by said breakpoint setting means.

* * * * *